(12) United States Patent
Konishiike et al.

(10) Patent No.: US 7,625,668 B2
(45) Date of Patent: Dec. 1, 2009

(54) ANODE AND BATTERY

(75) Inventors: Isamu Konishiike, Fukushima (JP);
Tomoo Takada, Fukushima (JP);
Kenichi Kawase, Fukushima (JP);
Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/670,244

(22) Filed: Feb. 1, 2007

(65) Prior Publication Data

US 2007/0128520 A1 Jun. 7, 2007

Related U.S. Application Data

(62) Division of application No. 10/969,815, filed on Oct. 20, 2004, now Pat. No. 7,432,014.

(30) Foreign Application Priority Data

| Nov. 5, 2003 | (JP) | ............................ P2003-376053 |
| Nov. 5, 2003 | (JP) | ............................ P2003-376054 |
| Nov. 5, 2003 | (JP) | ............................ P2003-376186 |

(51) Int. Cl.
*H01M 4/66* (2006.01)
(52) U.S. Cl. .................... 429/209; 429/231.95; 429/245
(58) Field of Classification Search ................. 429/101, 429/209, 231.95, 245
See application file for complete search history.

(56) References Cited

U.S. PATENT DOCUMENTS

| 5,464,524 A | * | 11/1995 | Ogiwara et al. | ............. 205/170 |
| 6,574,958 B1 | * | 6/2003 | MacGregor | ................... 60/527 |
| 6,685,805 B2 | | 2/2004 | Kiyota et al. | |

| 2002/0168572 A1 | 11/2002 | Tamura |

FOREIGN PATENT DOCUMENTS

| JP | 63-175345 | 7/1988 |
| JP | 04-206258 | 7/1992 |
| JP | 04-206265 | 7/1992 |
| JP | 08-050922 | 2/1996 |

(Continued)

OTHER PUBLICATIONS

Japanese Office Action issued on Nov. 15, 2006.

*Primary Examiner*—Jane Rhee
(74) *Attorney, Agent, or Firm*—Sonnenschein Nath & Rosenthal LLP

(57) ABSTRACT

The invention provides an anode capable of relaxing stress due to expansion and shrinkage of an anode active material layer associated with charge and discharge, or an anode capable of reducing structural destruction of the anode active material layer and reactivity between the anode active material layer and an electrolyte associated with charge and discharge, and a battery using it. The anode active material layer contains an element capable of forming an alloy with Li, for example, at least one from the group consisting of simple substances, alloys, and compounds of Si or Ge. An interlayer containing a material having superelasticity or shape-memory effect is provided between an anode current collector and the anode active material layer. Otherwise, the anode current collector is made of the material having superelasticity or shape-memory effect. Otherwise, a thin film layer containing the material having superelasticity or shape-memory effect is formed on the anode active material layer.

9 Claims, 8 Drawing Sheets

FOREIGN PATENT DOCUMENTS

| | | |
|---|---|---|
| JP | 11-135115 | 5/1999 |
| JP | 11-339777 | 10/1999 |
| JP | 2002-083594 | 3/2002 |
| JP | 2002-216747 | 8/2002 |
| JP | 2002-313348 | 10/2002 |
| JP | 2002-373644 | 12/2002 |
| WO | 01/31721 | 5/2001 |

* cited by examiner

ANODE AND BATTERY

CROSS REFERENCES TO RELATED APPLICATIONS

This application is a divisional of U.S. patent application Ser. No. 10/969,815, filed Oct. 20, 2004, now U.S. Pat. No. 7,432,014, the entirety of which is incorporated herein by reference to the extent permitted by law. The present application claims priority to Japanese Patent Application Nos. JP 2003-376186, filed in the Japanese Patent Office on Nov. 5, 2003, JP 2003-376053, filed in the Japanese Patent Office on Nov. 5, 2003, and JP 2003-376054, filed in the Japanese Patent Office on Nov. 5, 2003 the entire contents all of which being incorporated herein to the extent permitted by law.

BACKGROUND OF THE INVENTION

1. Field of the Invention

The present invention relates to an anode in which an anode current collector is provided with an anode active material layer, and a battery using it.

2. Description of the Related Art

In recent years, in connection with high-performance and multi-function of mobile devices, high capacities of secondary batteries, the power source for the mobile devices have been desired earnestly. As a secondary battery which meets this demand, there is a lithium secondary battery. However, in the case of using cobalt acid lithium for a cathode and graphite for an anode, which is currently a typical mode for the lithium secondary batteries, the battery capacity is in a saturated state, and it is extremely difficult to greatly obtain a high capacity of the battery. Therefore, from old times, using metallic lithium (Li) for an anode has been considered. However, in order to put this anode to practical use, it is necessary to improve efficiency of precipitation dissolution of lithium and to control dendrite precipitation form.

Meanwhile, a high capacity anode using silicon (Si), germanium (Ge), tin (Sn) or the like has been actively considered recently. However, when charge and discharge are repeated, these anodes are pulverized and miniaturized due to significant expansion and shrinkage of an active material, current collecting characteristics are lowered, and dissolution reaction of an electrolytic solution is promoted due to an increased surface area, so that their cycle characteristics are extremely poor. Therefore, an anode wherein an active material layer is formed on a current collector by vapor-phase deposition method, liquid-phase deposition method, sintering method or the like has been considered (for example, refer to Japanese Unexamined Patent Application Publication No. H08-50922, Japanese Patent Publication No. 2948205, and Japanese Unexamined Patent Application Publication No. H11-135115). When such an anode is used, miniaturization can be inhibited compared to conventional coating type anodes which are coated with a slurry containing a particulate active material, a binder and the like, and the current collector and the active material layer can be integrated. Therefore, electronic conductivity in the anode becomes extremely excellent, and high performance in terms of capacity and cycle life is expected. In addition, a conductive material, a binder, voids and the like which have conventionally existed in the anode can be reduced or excluded. Therefore, the anode can become a thin film essentially.

However, even when such an anode is used, sufficient cycle characteristics cannot be obtained, since there is a problem such as separation between the current collector and the active material and generation of crinkling in the current collector due to expansion and shrinkage of the active material associated with charge and discharge. Further, reactivity to an electrolyte is still high. There is also a problem that the reaction with the electrolyte associated with charge and discharge induces deterioration of the capacity.

As a method to solve these problems, for example, it is thinkable that an interlayer is formed between the current collector and the active material layer to improve contact characteristics between the current collector and the active material layer. To date, there have been reports about, for example, an anode in which a current collector is made of a metal or an alloy having a high mechanical strength and an interlayer made of copper (Cu) which is alloyed with an active material is formed between the current collector and the active material layer (for example, refer to Japanese Unexamined Patent Application Publication No. 2002-83594) and an anode in which an interlayer containing molybdenum (Mo) or tungsten (W) is formed between a current collector and an active material layer (for example, refer to Japanese Unexamined Patent Application Publication No. 2002-373644).

However, in the case where the interlayer made of copper or the like which is alloyed with an active material layer is formed between the current collector and the active material layer as described in Japanese Unexamined Patent Application Publication No. 2002-83594, there has been a problem that though contact characteristics between the current collector and the active material layer is improved, such effects are small compared to in conventional anodes in which a current collector is made of copper. Further, in the case where the interlayer containing molybdenum or tungsten is provided as described in Japanese Unexamined Patent Application Publication No. 2002-373644, there has been a problem that though excessive diffusion of a component element for the current collector into the active material layer can be inhibited, flexibility in a joint face between the current collector and the active material layer is often lost due to formation of such a metal layer having high hardness as an interlayer. Therefore, cycle characteristics have been hard to be improved.

Further, in Japanese Unexamined Patent Application Publication No. 2002-83594, tensile strength of the current collector is also described. However, as mechanical characteristics required for the current collector, flexibility such as elastic deformation ability is also important in addition to the strength. Therefore, it has been hard to improve cycle characteristics only by improving the tensile strength.

SUMMARY OF THE INVENTION

The invention has been achieved in consideration of such problems. It is a first object of the invention to provide an anode capable of relaxing stress due to expansion and shrinkage of an anode active material layer associated with charge and discharge and improving cycle characteristics, and a battery using it.

It is a second object of the invention to provide an anode capable of improving cycle characteristics by reducing structural destruction of an anode active material layer and reactivity between the anode active material layer and an electrolyte associated with charge and discharge, and a battery using it.

A first anode according to the invention is an anode, wherein an anode current collector is provided with an anode active material layer, comprising: an interlayer containing a material having superelasticity or shape-memory effect between the anode current collector and the anode active material layer.

A second anode according to the invention is an anode, wherein an anode current collector is provided with an anode active material layer, comprising: an interlayer containing nickel (Ni) and titanium (Ti) between the anode current collector and the anode active material layer.

A third anode according to the invention is an anode, wherein an anode current collector is provided with an anode active material layer, and wherein the anode current collector contains a material having superelasticity or shape-memory effect.

A fourth anode according to the invention is an anode, wherein an anode current collector is provided with an anode active material layer, and wherein the anode current collector contains nickel (Ni) and titanium (Ti).

A fifth anode according to the invention is an anode, wherein an anode current collector is provided with an anode active material layer, comprising: a thin film layer containing a material having superelasticity or shape-memory effect provided on the anode active material layer.

A sixth anode according to the invention is an anode, wherein an anode current collector is provided with an anode active material layer, comprising: a thin film layer containing nickel (Ni) and titanium (Ti) provided on the anode active material layer.

A first battery according to the invention is a battery, comprising: a cathode; an anode; and an electrolyte, wherein the anode comprises: an anode current collector; an anode active material layer provided on the anode current collector; and an interlayer containing a material having superelasticity or shape-memory effect provided between the anode active material layer and the anode current collector.

A second battery according to the invention is a battery, comprising: a cathode; an anode; and an electrolyte, wherein the anode comprises: an anode current collector; an anode active material layer provided on the anode current collector; and an interlayer containing nickel and titanium provided between the anode active material layer and the anode current collector.

A third battery according to the invention is a battery, comprising: a cathode; an anode; and an electrolyte, wherein the anode comprises: an anode current collector containing a material having superelasticity or shape-memory effect; and an anode active material layer provided on the anode current collector.

A fourth battery according to the invention is a battery, comprising: a cathode; an anode; and an electrolyte, wherein the anode comprises: an anode current collector containing nickel and titanium; and an anode active material layer provided on the anode current collector.

A fifth battery according to the invention is a battery, comprising: a cathode; an anode; and an electrolyte, wherein the anode comprises: an anode current collector; an anode active material layer provided on the anode current collector; and a thin film layer containing a material having superelasticity or shape-memory effect provided on the anode active material layer.

A sixth battery according to the invention is a battery, comprising: a cathode; an anode; and an electrolyte, wherein the anode comprises: an anode current collector; an anode active material layer provided on the anode current collector; and a thin film layer containing nickel and titanium provided on the anode active material layer.

According to the first anode and the first battery of the invention, the interlayer containing the material having superelasticity or shape-memory effect is provided between the anode current collector and the anode active material layer. Therefore, stress due to expansion and shrinkage of the anode active material layer can be relaxed. Consequently, destruction of the anode can be inhibited, and cycle characteristics can be improved.

In particular, when a material which does not form an intermetallic compound with lithium is contained as a material having superelasticity or shape-memory effect, expansion and shrinkage of the interlayer and separation of the interlayer from the anode current collector associated with charge and discharge can be inhibited.

According to the second anode and the second battery of the invention, the interlayer containing nickel and titanium is provided between the anode current collector and the anode active material layer. Therefore, stress due to expansion and shrinkage of the anode active material layer can be relaxed, expansion and shrinkage of the interlayer and separation of the interlayer from the anode current collector can be inhibited. Consequently, destruction of the anode can be inhibited, and cycle characteristics can be improved.

In particular, when a composition ratio between nickel and titanium in the interlayer is nickel:titanium=49 to 52:51 to 48, or nickel:titanium=35 to 45:45 to 55 at an atomic ratio, higher effect can be obtained.

According to the third anode and the third battery of the invention, the anode current collector contains the material having superelasticity or shape-memory effect. Therefore, stress due to expansion and shrinkage of the anode active material layer can be relaxed. Consequently, destruction of the anode can be inhibited, and cycle characteristics can be improved.

In particular, when a material which does not form an intermetallic compound with lithium is contained as a material having superelasticity or shape-memory effect, structural destruction of the anode current collector due to forming an intermetallic compound with lithium can be inhibited, and cycle characteristics can be further improved.

According to the fourth anode and the fourth battery of the invention, the anode current collector contains nickel and titanium. Therefore, stress due to expansion and shrinkage of the anode active material layer can be relaxed, and structural destruction of the anode current collector due to forming an intermetallic compound with lithium can be inhibited. Consequently, destruction of the anode can be inhibited, and cycle characteristics can be improved.

According to the fifth anode and the fifth battery of the invention, the thin film layer containing the material having superelasticity or shape-memory effect is provided on the anode active material layer. Therefore, reaction between the anode active material layer and an electrolyte, and structural destruction of the anode active material layer due to expansion and shrinkage of the anode active material layer can be inhibited. In addition, separation of the thin film layer due to expansion and shrinkage of the anode active material layer can be inhibited. Consequently, cycle characteristics can be improved.

In particular, when a material which does not form an intermetallic compound with lithium is contained as a material having superelasticity or shape-memory effect, expansion and shrinkage of the thin film layer and separation of the thin film layer associated with charge and discharge can be inhibited.

According to the sixth anode and the sixth battery of the invention, the thin film layer containing nickel and titanium is provided on the anode active material layer. Therefore, reaction between the anode active material layer and an electrolyte, and structural destruction of the anode active material layer due to expansion and shrinkage of the anode active material layer can be inhibited. In addition, separation of the thin film layer due to expansion and shrinkage of the anode active material layer and expansion and shrinkage of the thin film layer can be inhibited. Consequently, cycle characteristics can be improved.

In particular, when a composition ratio between nickel and titanium in the thin film layer is nickel:titanium=49 to 52:51 to 48, or nickel:titanium=35 to 45:45 to 55 at an atomic ratio, higher effect can be obtained.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment

Figure 1:
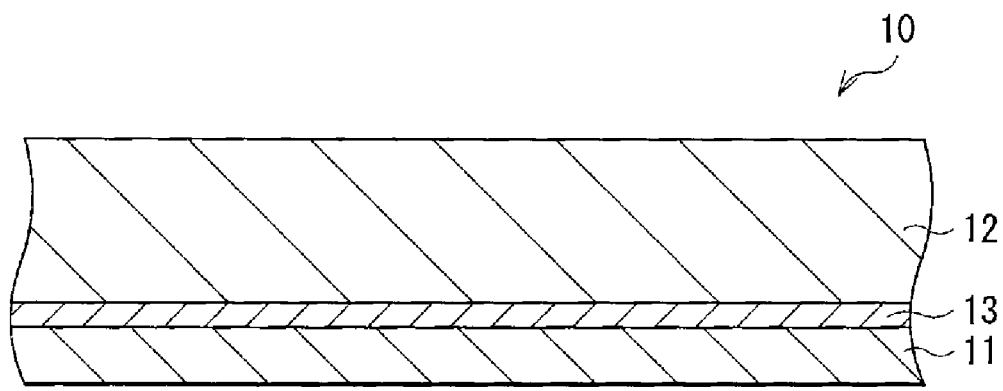
FIG. 1 is a cross section simply showing a construction of an anode according to a first embodiment of the invention.

FIG. 1 shows a simplified construction of an anode 10 according to a first embodiment of the invention. The anode 10 of this embodiment has, for example, an anode current collector 11, an anode active material layer 12 provided for the anode current collector 11, and an interlayer 13 provided between the anode current collector 11 and the anode active material layer 12. The anode active material layer 12 and the interlayer 13 can be formed on both sides or a single side of the anode current collector 11.

The anode current collector 11 is preferably made of a metal material having high conductivity. In particular, the anode current collector 11 is preferably made of a metal material containing at least one of metal elements which do not form an intermetallic compound with lithium. When the intermetallic compound is formed with lithium, expansion and shrinkage arise associated with charge and discharge, structural destruction arises, and current collecting characteristics become lowered. In addition, an ability to support the anode active material layer 12 becomes small, and therefore, the anode active material layer 12 easily separates from the anode current collector 11. In this specification, the metal material includes not only simple substances of metal elements, but also alloys made of two or more metal elements, or alloys made of one or more metal elements and one or more semimetal elements. Examples of the metal element which does not form an intermetallic compound with lithium include copper, nickel, titanium, iron (Fe), and chromium (Cr).

However, in the case where the interlayer 13 is made of a material with which diffusion of lithium is hard to arise, or in the case where coverage with the interlayer 13 for the anode current collector 11 is high, it is possible that the anode current collector 11 is made of a material which forms an intermetallic compound with lithium.

The anode active material layer 12 contains, for example, at least one from the group consisting of simple substances, alloys, compounds of elements capable of forming an alloy with lithium as an anode active material. Specially, as an anode active material, at least one from the group consisting of simple substances, alloys, and compounds of silicon or germanium is preferably contained. In particular, a simple substance, alloys, and compounds of silicon are preferable. The simple substance, the alloys, and the compounds of silicon have a high ability to insert and extract lithium, and can raise an energy density of the anode 10 compared to conventional graphite according to combination thereof. In particular, the simple substance, the alloys, and the compounds of silicon have low toxicity and are inexpensive.

Examples of the alloy or the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$) and LiSiO. Examples of the compound of germanium include $Ge_3N_4$, GeO, $GeO_2$, GeS, $GeS_2$, $GeF_4$, and $GeBr_4$.

The anode active material layer 12 is preferably formed by at least one method from the group consisting of vapor-phase deposition method, liquid-phase deposition method, and sintering method. The reason thereof is that destruction due to expansion and shrinkage of the anode active material layer 12 associated with charge and discharge can be inhibited, the anode active material layer 12 can be formed on the interlayer 13 with good contact characteristics, and electronic conductivity in the anode active material layer 12 can be improved. In addition, a binder, voids and the like can be reduced or excluded, and the anode 10 can become a thin film. In the specification, "forming the anode active material by sintering method" means forming a denser layer having a higher volume density than before heat treatment by performing heat treatment for a layer formed by mixing powders containing an active material and a binder under a non-oxidizing atmosphere or the like.

The anode active material layer 12 can be formed by coating, more specifically, can contain an anode active material and a binder such as polyvinylidene fluoride according to need. However, as described above, the anode active material layer 12 is preferably formed by at least on method from the group consisting of vapor-phase deposition method, liquid-phase deposition method, and sintering method.

Further, the anode active material 12 can be alloyed with the interlayer 13 at least in part of an interface with the interlayer 13, in order to prevent the anode active material 12 from separating from the anode current collector 11 due to expansion and shrinkage. Specifically, it is possible that in the interface therebetween, a component element of the interlayer 13 can be diffused in the anode active material layer 12, or a component element of the anode active material layer 12 can be diffused in the interlayer 13, or the both component elements can be diffused in each other. This alloying may arise concurrently with forming the anode active material layer 12 by vapor-phase deposition method, liquid-phase deposition method, or sintering method. Excessive alloying is not preferable since characteristics of the interlayer 13 are lost. However, some degree of alloying is allowed as long as a portion having a target composition remains in the interlayer 13, since in such case characteristics can be improved. In this specification, the diffusion of elements described above is also included in alloying.

Though not shown, it is possible that a layer made of a metal or the like is inserted between the anode active material layer 12 and the interlayer 13 in order to inhibit alloying thereof.

The interlayer 13 preferably contains a material having superelasticity or shape-memory effect, such as an alloy. When such material is contained, even the anode active material layer 12 is expanded and shrunk associated with charge and discharge, its stress can be relaxed and separation of the anode active material layer 12 can be inhibited. Here, the superelasticity is characteristics that deformation caused by stress-induced martensitic transformation when loaded is recovered by reverse transformation when unloaded, as defined in "JIS H7001 No. 1011." The shape-memory effect is a phenomenon that even if an alloy in a certain shape is deformed into a different shape in a state of hypothermic phase (martensite), reverse transformation arises when the alloy is heated to a temperature at which a high temperature phase (parent phase) becomes stable, and the deformed shape returns to the shape before deformation, as defined in "JIS H7001 No. 1002."

Further, as a material having superelasticity or shape-memory effect, a material which does not form an intermetallic compound with lithium is preferable. When the material of the interlayer 13 forms an intermetallic compound with lithium, the interlayer 13 is expanded and shrunk associated with charge and discharge, and therefore the interlayer 13 easily separates from the anode current collector 11. Examples of such material include an alloy containing nickel and titanium such as nickel-titanium alloy, and an alloy containing one or more other elements such as copper, niobium (Nb), zirconium (Zr), chromium, manganese (Mn), iron, and cobalt (Co) in addition to nickel and titanium. Further, an alloy containing manganese and copper can be cited.

Specially, the alloy containing nickel and titanium is preferable, since the alloy containing nickel and titanium has good superelasticity and shape-memory effect, does not form an intermetallic compound with lithium, has superior corrosion resistance, and has superior contact characteristics with the anode current collector 11 and the anode active material layer 12. In particular, the nickel-titanium alloy preferably contains 51 atomic % to 48 atomic % of titanium to 49 atomic % to 52 atomic % of nickel. The alloy containing other element in addition to nickel and titanium preferably contains 45 atomic % to 55 atomic % of titanium to 35 atomic % to 45 atomic % of nickel. That is, when the interlayer 13 contains these alloys, a composition ratio between nickel and titanium in the interlayer 13 is preferably nickel:titanium=49 to 52:51 to 48 or nickel:titanium=35 to 45:45 to 55 at an atomic ratio. Other element for the alloy containing other element in addition to nickel and titanium is preferably copper, but the foregoing other element can be also contained in addition to copper. Copper can be solved in the nickel-titanium alloy at a ratio of 30 atomic % or more. Further, copper is inexpensive and its characteristics are excellent.

The interlayer 13 is preferably formed by at least one method from the group consisting of vapor-phase deposition method, liquid-phase deposition method, and sintering method. The reason thereof is that adhesion with the anode current collector 11 can be improved, and the interlayer 13 can be uniformly formed on the anode current collector 11. Specially, vapor-phase deposition method is preferable, since a thin film can be obtained more easily.

It is enough that the interlayer 13 is provided at least in part of a clearance between the anode current collector 11 and the anode active material layer 12. It is not necessary that the interlayer 13 is provided over a whole area of the clearance between the anode current collector 11 and the anode active material layer 12. For example, the interlayer 13 can be provided in the shape of an island, or can have an aperture.

This anode 10 can be manufactured, for example, as follows.

First, for example, the anode current collector 11 made of a metal foil is prepared, and the interlayer 13 is formed on the anode current collector 11 by, for example, vapor-phase deposition method. Vapor-phase deposition method is preferable since a thin film can be uniformly formed. As vapor-phase deposition method, for example, vacuum deposition method or sputtering method is preferable. For example, when the sputtering method is used, it is possible to use a sputtering target consisting of an alloy previously adjusted to provide a target composition, or to use co-sputtering using a multitarget. Further, it is possible that after a thin film of nickel and a thin film of titanium are alternately layered, alloying is performed by heat treatment. Further, in order to obtain superelasticity and shape-memory effect, heating can be provided during deposition, or heat treatment can be provided under a non-oxidizing atmosphere after deposition.

Further, the interlayer 13 can be formed by liquid-phase deposition method. Further, the interlayer 13 can be formed by coating with alloy powders fabricated by mechanical alloy method or the like and sintering. Further, the interlayer 13 can be formed by a combination of two or more of vapor-phase deposition method, liquid-phase deposition method, and sintering method.

Next, the anode active material layer 12 is formed on the interlayer 13 by, for example, vapor-phase deposition method, liquid-phase deposition method, or sintering method, or by a combination of two or more thereof. Then, at least part of an interface between the interlayer 13 and the anode active material layer 12 may be alloyed. In some cases, in order to alloy the interlayer 13 and the anode active material layer 12, heat treatment can be provided under a vacuum atmosphere or a non-oxidizing atmosphere. On the contrary, in some cases, in order to inhibit alloying between the interlayer 13 and the anode active material layer 12, it is possible that after a layer for inhibiting such alloying is formed on the interlayer 13, the anode active material layer 12 is formed thereon.

Further, when both the interlayer 13 and the anode active material layer 12 are formed by vapor-phase deposition method, they can be continuously formed in the same bath without exposed to the atmosphere. Such forming is preferable, since the interlayer 13 and the anode active material layer 12 can be contacted more securely.

As vapor-phase deposition method, for example, physical deposition method or chemical deposition method can be cited. More specifically, vacuum deposition method, sputtering method, ion plating method, laser ablation method, heat CVD (Chemical Vapor Deposition) method, plasma CVD method and the like can be cited. As liquid-phase deposition method, known techniques such as electrolytic plating method and electroless plating method can be used. Regarding sintering method, known techniques can be used. For example, atmosphere sintering method, reaction sintering method, or hot press sintering method can be used.

Further, the anode active material layer 12 can be formed by coating. More specifically, for example, a mixture is prepared by mixing an anode active material and a binder, this mixture is dispersed into a disperse medium such as N-methyl pyrrolidone to fabricate a mixture slurry. The anode current collector 11 is coated with this mixture slurry, dried, and compression-molded. The anode active material layer 12 is thereby formed. However, using vapor-phase deposition method, liquid-phase deposition method, or sintering method is preferable since contact characteristics between the interlayer 13 and the anode active material layer 12 can be improved. The anode 10 shown in FIG. 1 is thereby obtained.

This anode 10 is used for, for example, an anode of a secondary battery as below.

Figure 2:
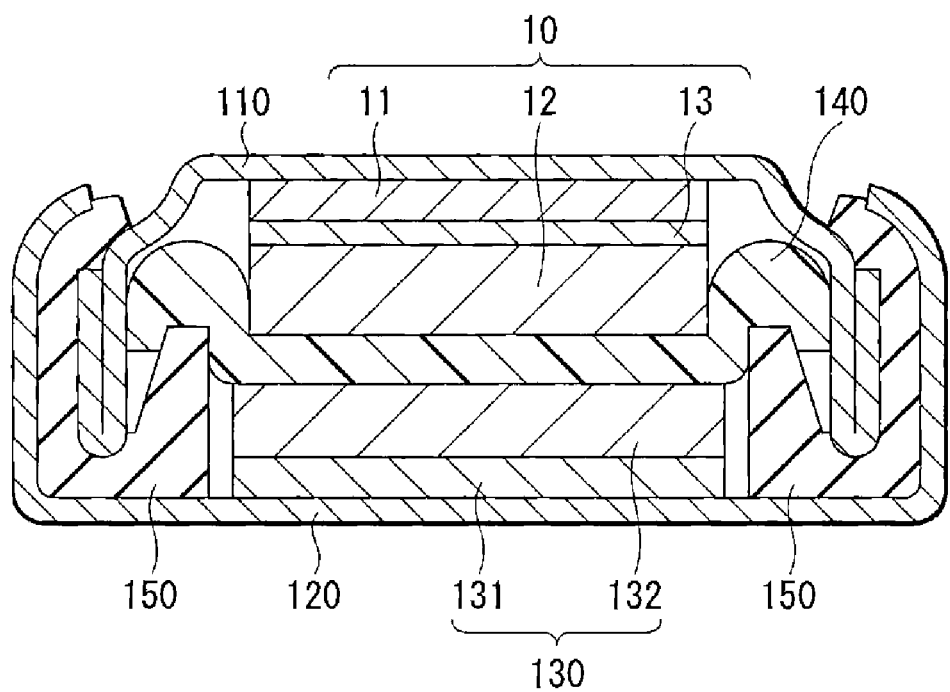
FIG. 2 is a cross section showing a construction of a secondary battery using the anode shown in FIG. 1.

FIG. 2 shows a construction of the secondary battery. This secondary battery is a so-called coin type secondary battery. The anode 10 housed in an exterior cup 110 and a cathode 130 housed in an exterior can 120 are layered with a separator 140 in between. Peripheral edges of the exterior cup 110 and the exterior can 120 are hermetically closed by caulking through insulative gaskets 150. The exterior cup 110 and the exterior can 120 are made of, for example, a metal such as stainless and aluminum, respectively.

The cathode 130 has, for example, a cathode current collector 131 and a cathode active material layer 132 provided on the cathode current collector 131. Arrangement is made so that the cathode active material layer 132 side faces to the interlayer 13. The cathode current collector 131 is made of, for example, aluminum, nickel, or stainless.

The cathode active material layer 132 contains, for example, one or more of cathode materials capable of inserting and extracting lithium as a cathode active material. The cathode active material layer 132 can also contain a conductive material such as a carbon material and a binder such as polyvinylidene fluoride according to need. As a cathode material capable of inserting and extracting lithium, for example, a lithium-containing metal complex oxide expressed as a general formula of $Li_xMIO_2$ is preferable, since the lithium-containing metal complex oxide can generate a high voltage and has a high density, and therefore a higher capacity of the secondary battery can be further obtained. MI represents one or more transition metals, and is preferably at least one of cobalt and nickel. x varies according to a charge and discharge state of the battery, and is generally in the range of $0.05 \leq X \leq 1.10$. Concrete examples of the lithium-containing metal complex oxide include $LiCoO_2$ and $LiNiO_2$.

This cathode 130 can be fabricated, for example, by forming the cathode active material layer 132 by mixing a cathode active material, a conductive material, and a binder to prepare a mixture, dispersing this mixture in a disperse medium such as N-methyl pyrrolidone to fabricate a mixture slurry, coating the cathode current collector 131 made of a metal foil with this mixture slurry, drying the resultant, and then compression-molding the resultant.

A separator 140 is intended to separate the cathode 10 from the anode 130, prevent current short circuit due to contact between the cathode and the anode, and let through lithium ions. The separator 140 is made of, for example, polyethylene or polypropylene.

An electrolytic solution as a liquid electrolyte is impregnated in the separator 140. This electrolytic solution contains, for example, a solvent and a lithium salt as an electrolyte salt dissolved in this solvent. The electrolytic solution can also contain additives according to need. Examples of the solvent include organic solvents such as ethylene carbonate, propylene carbonate, dimethyl carbonate, diethyl carbonate, and ethyl methyl carbonate. One or a mixture thereof can be used.

Examples of the lithium salt include $LiPF_6$, $LiCF_3SO_3$, and $LiClO_4$. One or a mixture thereof can be used.

This secondary battery can be manufactured by, for example, layering the anode 10, the separator 140 in which the electrolytic solution is impregnated, and the cathode 130, inserting the layered body in the exterior cup 110 and the exterior can 120, and providing caulking.

In this secondary battery, when charged, for example, lithium ions are extracted from the cathode 130, and are inserted in the anode 10 through the electrolytic solution. When discharged, for example, lithium ions are extracted from the anode 10, and are inserted in the cathode 130 through the electrolytic solution. Then, even when the anode active material layer 12 is expanded and shrunk associated with charge and discharge, its stress is relaxed by the interlayer 13 containing the material having superelasticity and shape-memory effect. Therefore, cycle characteristics are improved.

The anode 10 according to this embodiment can be used for the following secondary battery as well.

Figure 3:
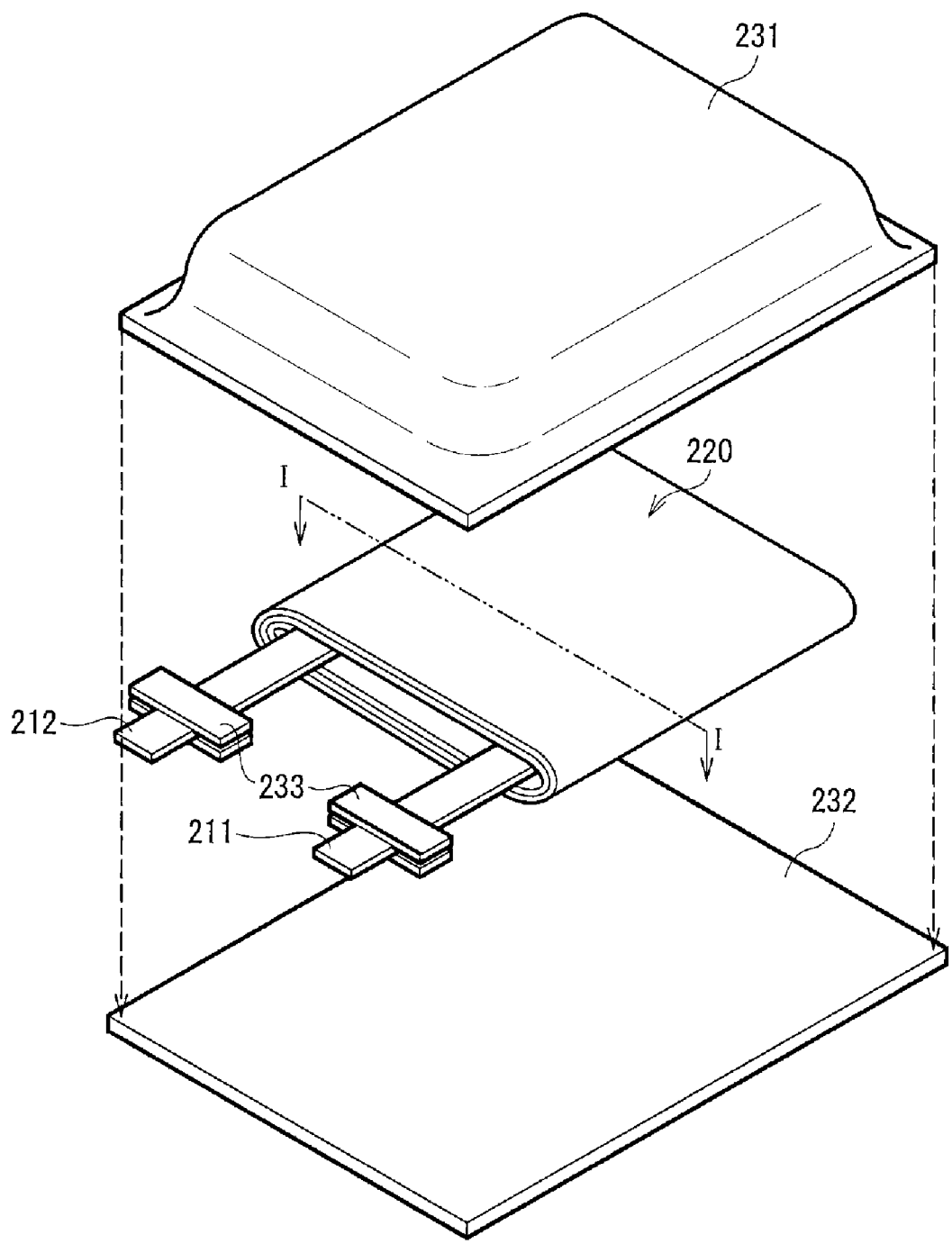
FIG. 3 is an exploded perspective view showing a construction of other secondary battery using the anode shown in FIG. 1.

FIG. 3 shows a construction of the secondary battery. This secondary battery is a secondary battery wherein an electrode winding body 220 to which leads 211 and 212 are attached is housed inside film exterior members 231 and 232, and its size, weight and thickness can be reduced.

The leads 211 and 212 are directed from inside of the exterior members 231 and 232 to outside thereof, and, for example, are derived in the same direction. The leads 211 and 212 are respectively made of a metal material such as aluminum, copper, nickel, and stainless, and are respectively in the shape of a thin plate or in the shape of a net.

The exterior members 231 and 232 are made of a rectangle aluminum laminated film, wherein, for example, a nylon film, an aluminum foil, and a polyethylene film are bonded together in this order. The exterior members 231 and 232 are, for example, arranged so that the polyethylene film side and the electrode winding body 220 are placed opposite, and respective outer edge parts thereof are fusion-bonded or adhered to each other. Adhesive films 233 to protect from outside air intrusion are inserted between the exterior members 231, 232, and the leads 211, 212. The adhesive films 233 are made of a material having contact characteristics to the leads 211 and 212, for example, a polyolefin resin such as polyethylene, polypropylene, modified polyethylene, and modified polypropylene.

The exterior members 231 and 232 can be made of a laminated film having other structure, a high molecular weight film such as polypropylene, or a metal film, instead of the foregoing aluminum laminated film.

Figure 4:
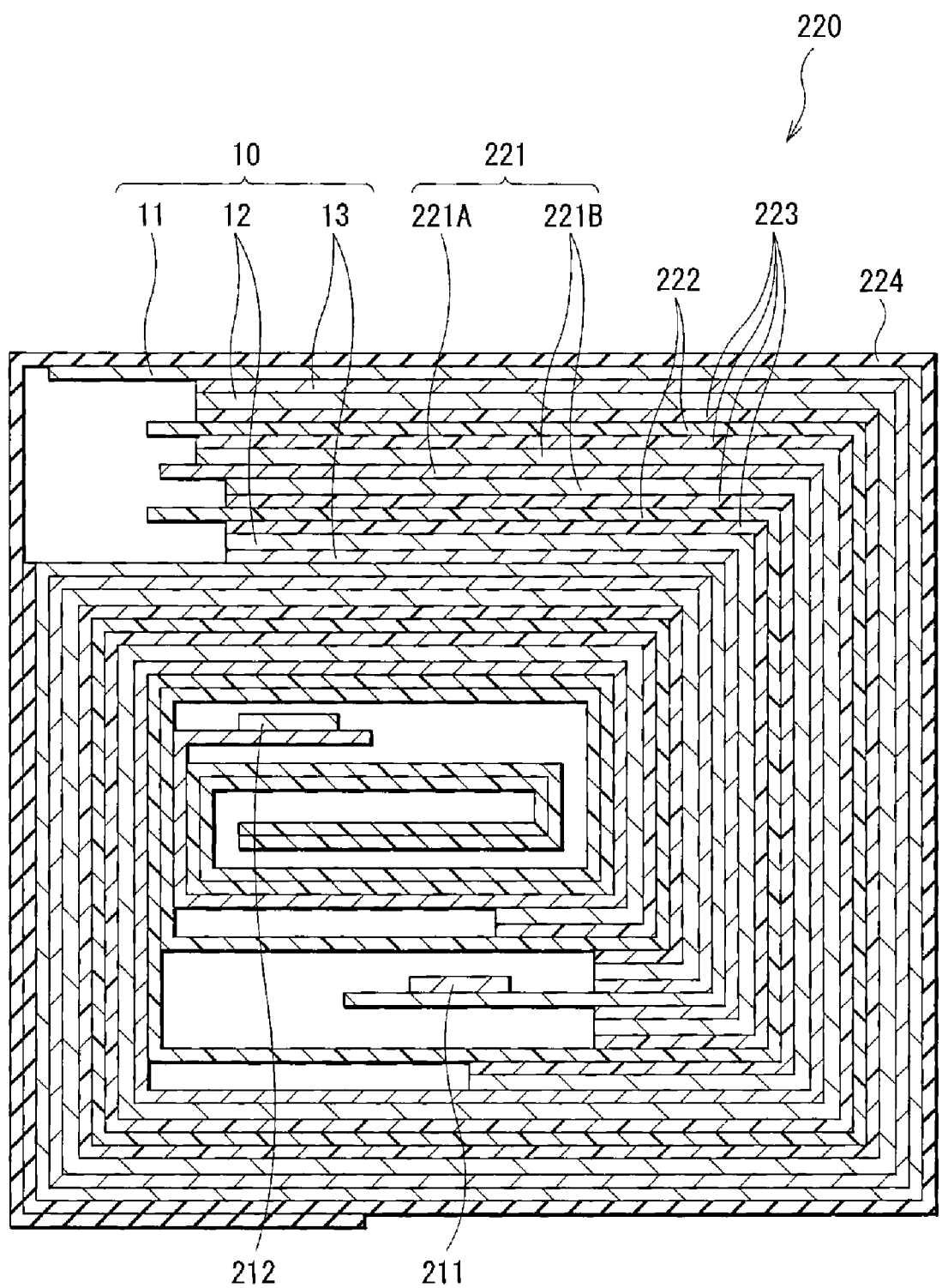
FIG. 4 is a cross section showing a construction taken along line I-I of an electrode winding body shown in FIG. 3.

FIG. 4 shows a cross sectional structure taken along line I-I of the electrode winding body 220 shown in FIG. 3. In the electrode winding body 220, the anode 10 and a cathode 221 are layered and wound with a separator 222 and an electrolyte layer 223 in between, and an outermost part thereof is protected by a protective tape 224.

The anode 10 has a structure wherein the anode active material layer 12 is provided on a single side or both sides of the anode current collector 11. The cathode 221 also has a structure wherein cathode active material layer 221B is provided on a single side or both sides of a cathode current collector 221A. Arrangement is made so that the cathode active material layer 221B side faces to the anode active material layer 12. Constructions of the cathode current collector 221A, the cathode active material layer 221B, and the separator 222 are similar to that of the foregoing cathode current collector 131, the cathode active material layer 132, and the separator 140.

The electrolyte layer 223 is made of a so-called gelatinous electrolyte, wherein an electrolytic solution is held in a holding body. The gelatinous electrolyte is preferable since the gelatinous electrolyte can provide high ion conductivity and can prevent liquid leakage of the battery or expansion at high temperatures. A construction of the electrolytic solution (that is, a solvent and an electrolyte salt) is similar to that of the coin type secondary battery shown in FIG. 2. The holding body is made of, for example, a high molecular weight compound material. Examples of the high molecular weight compound material include polyvinylidene fluoride.

This secondary battery can be, for example, manufactured as follows.

First, the electrolyte layers 223 wherein the electrolytic solution is held in the holding body are formed on the anode 10 and the cathode 221, respectively. After that, the lead 211 is attached to an end of the anode current collector 11 by welding, and the lead 212 is attached to an end of the cathode current collector 221A by welding. Next, after making a lamination by layering the anode 10 and the cathode 221 on which the electrolyte layers 223 are formed with the separator 222 in between, this lamination is wound in its longitudinal direction, the protective tape 224 is bonded to the outermost circumferential part to form the electrode winding body 220. Finally, for example, the electrode winding body 220 is sandwiched between the exterior members 231 and 232, and the electrode winding body 220 is enclosed by contacting outer edges of the exterior members 231 and 232 by thermal fusion bonding or the like. Then, the adhesive films 233 are inserted between the leads 211, 212 and the exterior members 231, 232. Consequently, the secondary battery shown in FIGS. 3 and 4 is completed.

This secondary battery operates similar to the coin type secondary battery shown in FIG. 2 does.

As above, in this embodiment, the interlayer 13 containing the material having superelasticity or shape-memory effect is provided between the anode current collector 11 and the anode active material layer 12. Therefore, stress due to expansion and shrinkage of the anode active material layer 12 associated with charge and discharge can be relaxed. In the result, destruction of the anode 10 can be inhibited, and cycle characteristics can be improved.

In particular, the material which does not form an intermetallic compound with lithium is contained as a material having superelasticity or shape-memory effect, it is possible to inhibit expansion and shrinkage of the interlayer 13 associated with charge and discharge, and separation of the interlayer 13 from the anode current collector 11.

Further, when the interlayer 13 contains nickel and titanium, higher effect can be obtained. In particular, when a composition ratio between nickel and titanium in the interlayer 13 is nickel:titanium=49 to 52:51 to 48 or nickel:titanium=35 to 45:45 to 55 at an atomic ratio, further higher effect can be obtained.

Second Embodiment

Figure 5:
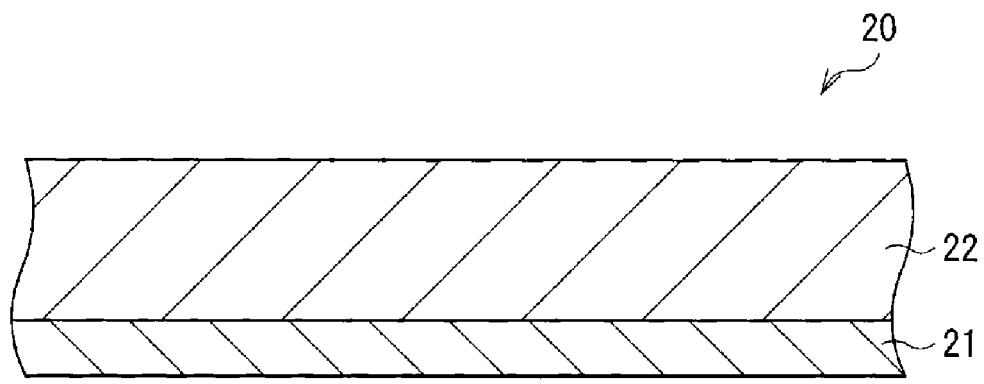
FIG. 5 is a cross section simply showing a construction of an anode according to a second embodiment of the invention.

FIG. 5 shows a simplified construction of an anode 20 according to a second embodiment of the invention. The anode 20 has, for example, an anode current collector 21 and an anode active material layer 22 provided on the anode current collector 21. The anode active material layer 22 can be formed on both sides or a single side of the anode current collector 21.

The anode current collector 21 contains a material having superelasticity or shape-memory effect, such as an alloy at least as a part of the anode current collector 21. When such material is contained, even if the anode active material layer 22 is expanded or shrunk associated with charge and discharge, its stress can be relaxed and separation of the anode active material layer 22 can be inhibited. Definitions of the superelasticity and the shape-memory effect are as described in the first embodiment.

Further, as a material having superelasticity or shape-memory effect, a material which does not form an intermetallic compound with lithium is preferable as the interlayer 13 described in the first embodiment. When the material for the anode current collector 21 forms an intermetallic compound with lithium, the anode current collector 21 is expanded and shrunk associated with charge and discharge, and therefore structural destruction arises and current collectivity is lowered. In addition, an ability to support the anode active material layer 22 is lowered, and therefore the anode active material layer 22 easily separates from the anode current collector 21. As such a material, the materials similar to that of the first embodiment can be cited. As particularly preferable materials, the materials similar to that of the first embodiment can be cited.

The anode current collector 21 can be made of a monolayer, or a plurality of layers. In the latter case, it is possible to provide a layer containing a material which is alloyed with the anode active material layer 22 between the layer containing the material having superelasticity or shape-memory effect and the anode active material layer 22.

Surface roughness of the anode current collector 21 where the anode active material 22 is formed is preferably 0.8 µm or more, more preferably 1.2 µm or more, and still more preferably in the range from 1.2 µm to 12.0 µm based on ten points average roughness (Rz) described in Appendix 1 of JIS B0601. The reason thereof is that shapes of cracks generated in the anode active material layer 22 can be controlled, stress due to expansion and shrinkage of the anode active material layer 22 can be dispersed, and therefore, cycle characteristics can be improved.

In this case, the anode current collector 21 can be, for example, an anode current collector whose surface is lapped by lapping process, or an anode current collector wherein projecting parts are formed on a surface of its base by plating or deposition. The anode current collector wherein the projecting parts are formed is preferable since higher effect can be obtained. A material for the projecting parts can be the same as of the base, or different from the base. For example, the foregoing material having superelasticity or shape-memory effect can be used. Otherwise, a metal material not having such characteristics, such as copper, nickel, titanium, iron, and chromium can be used. Otherwise, an oxide such as aluminum oxide ($Al_2O_3$) and silicon dioxide ($SiO_2$) can be used. However, a material which does not form an intermetallic compound with lithium is preferable. When the intermetallic compound is formed with lithium, expansion and shrinkage of the projecting parts arise associated with charge and discharge. Therefore, destruction of the anode current collector 21 arises, or the anode active material layer 22 easily separates from the anode current collector 21.

The anode active material layer 22 has the same construction as of the anode active material layer 12 described in the first embodiment. It is possible that the anode active material layer 22 is alloyed with the anode current collector 21 at least in part of an interface with the anode current collector 21 to prevent the anode active material layer 22 from separating from the anode current collector 21 due to expansion and shrinkage.

This anode 20 can be manufactured as follows, for example.

First, for example, the anode current collector 21 containing a material having superelasticity or shape-memory effect is prepared. Then, according to need, it is possible that its surface is lapped by lapping process, or projecting parts are formed by deposition or plating.

Next, the anode active material layer 22 is formed on the anode current collector 21 by, for example, vapor-phase deposition method, liquid-phase deposition method, or sintering method, or by two or more thereof. Then, at least part of an interface between the anode current collector 21 and the anode active material layer 22 may be alloyed. In some cases, in order to alloy the anode current collector 21 and the anode active material layer 22, heat treatment can be additionally provided under a vacuum atmosphere or a non-oxidizing atmosphere. The vapor-phase deposition method, the liquid-phase deposition method, and the sintering method are as described in the first embodiment.

Further, the anode active material layer 22 can be formed by coating. However, using vapor-phase deposition method, liquid-phase deposition method, or sintering method is preferable since contact characteristics between the anode current collector 21 and the anode active material layer 22 can be improved. The anode 20 shown in FIG. 5 is thereby obtained.

Figure 6:
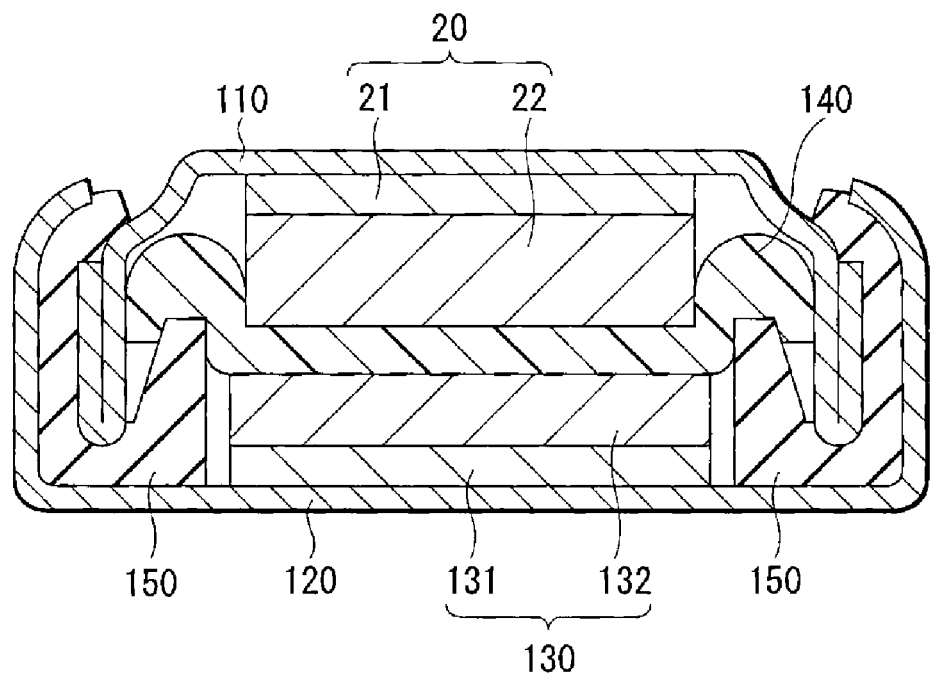
FIG. 6 is a cross section showing a construction of a secondary battery using the anode shown in FIG. 5.
Figure 7:
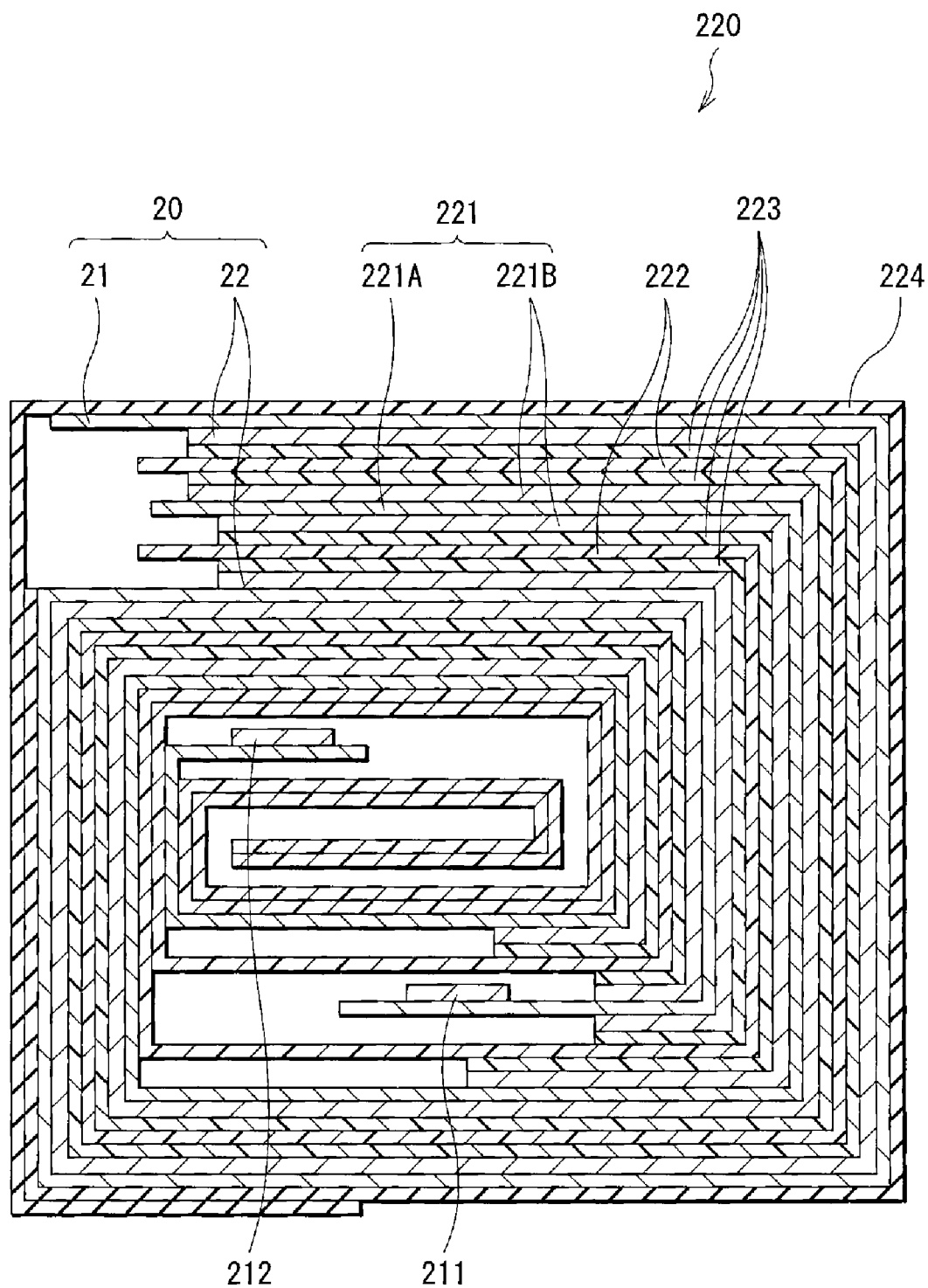
FIG. 7 is a cross section showing a construction of other secondary battery using the anode shown in FIG. 5.

This anode 20 can be used for secondary batteries similar to in the first embodiment, for example. That is, as shown in FIGS. 6 and 7, the secondary batteries in the second embodiment are the same as the secondary batteries shown in FIG. 2 or FIG. 4, except that the anode 20 is used instead of the anode 10.

In these secondary batteries, even if the anode active material layer 22 is expanded and shrunk associated with charge and discharge, their stress can be relaxed, since the anode current collector 21 contains the material having superelasticity or shape-memory effect. Therefore, cycle characteristics are improved.

As above, in this embodiment, the anode current collector 21 contains the material having superelasticity or shape-memory effect. Therefore, stress due to expansion and shrinkage of the anode active material layer 22 associated with charge and discharge can be relaxed. In result, destruction of the anode 20 can be inhibited, and cycle characteristics can be improved.

In particular, when the material which does not form an intermetallic compound with lithium is contained as a material having superelasticity or shape-memory effect, it is possible to inhibit expansion and shrinkage and structural destruction of the anode current collector 21 associated with charge and discharge. Therefore, cycle characteristics can be further improved.

Further, when the anode current collector 21 contains nickel and titanium, higher effect can be obtained. In particular, when a composition ratio between nickel and titanium in the anode current collector 21 is nickel:titanium=49 to 52:51 to 48 or nickel:titanium=35 to 45:45 to 55 at an atomic ratio, further higher effect can be obtained.

Third Embodiment

Figure 8:
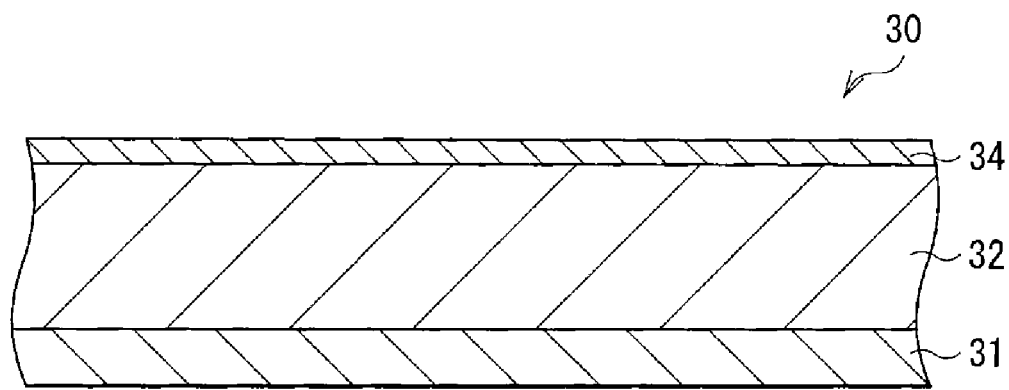
FIG. 8 is a cross section simply showing a construction of an anode according to a third embodiment of the invention.

FIG. 8 shows a simplified construction of an anode 30 according to a third embodiment of the invention. The anode 30 has, for example, an anode current collector 31, an anode active material layer 32 provided on the anode current collector 31, and a thin film layer 34 provided on the anode active material layer 32. The anode current collector 31, the anode active material layer 32, and the thin film layer 33 are layered in this order. The anode active material layer 32 and the thin film layer 33 can be formed on both sides or a single side of the anode current collector 31.

The anode current collector 31 is preferably made of a metal material containing at least one of metal elements which do not form an intermetallic compound with lithium. When the intermetallic compound is formed with lithium, expansion and shrinkage arise associated with charge and discharge, structural destruction arises, and current collecting characteristics become lowered. In addition, an ability to support the anode active material layer 32 becomes small, and therefore, the anode active material layer 32 easily separates from the anode current collector 31. The metal element which does not form an intermetallic compound with lithium is as described in the first embodiment.

Further, the anode current collector 31 is preferably made of a metal material containing a metal element which does not form an intermetallic compound with lithium, and which is alloyed with the anode active material layer 32. When the anode active material layer 32 contains a simple substance, an alloy, or a compound of elements which can form an alloy with lithium, the anode active material layer 32 is largely expanded and shrunk associated with charge and discharge, and easily separates from the anode current collector 31. However, such separation can be inhibited by securely bonding the anode active material layer 32 and the anode current collector 31 by alloying. As a metal element which does not form an intermetallic compound with lithium, and which is alloyed with the anode active material layer 32, for example, as a metal element which is alloyed with a simple substance, an alloy, or a compound of silicon or germanium, copper, nickel, or iron can be cited. In view of alloying with the anode active material layer 32, strength, and conductivity, copper, nickel, or iron is preferable.

The anode current collector 31 can be made of a mono-layer, or a plurality of layers. In the latter case, it is possible that a layer adjacent to the anode active material layer 32 is made of the material which is alloyed with the anode active material layer 32, and other layers are made of other metal materials. Further, it is preferable that the anode current collector 31 is made of the metal material consisting of at least one of the metal elements which do not form the intermetallic compound with lithium, except for an interface with the anode active material layer 32.

The anode active material layer 32 has the same construction as of the anode active material layer 12 described in the first embodiment. It is preferable that the anode active material layer 32 is alloyed with the anode current collector 31 at least in part of the interface with the anode current collector 31 to prevent the anode active material layer 32 from separating from the anode current collector 31 due to expansion and shrinkage. This alloying often arises concurrently with forming the anode active material layer 32 by vapor-phase deposition method, liquid-phase deposition method, or sintering method. However, this alloying can be caused by additional heat treatment.

The thin film layer 34 is intended to inhibit reaction between the anode active material layer 32 and an electrolyte, and inhibit structural destruction of the anode active material layer 32 associated with charge and discharge by covering the anode active material layer 32. The thin film layer 34 preferably contains a material having superelasticity and shape-memory effect, such as an alloy. When such material is contained, even when the anode active material layer 32 is expanded or shrunk associated with charge and discharge, this thin film layer 34 is hard to be separated. Definitions of the superelasticity and the shape-memory effect are as described in the first embodiment.

Further, as a material having superelasticity or shape-memory effect, a material which does not form an intermetallic compound with lithium is preferable. When the material of the thin film layer 34 forms the intermetallic compound with lithium, the thin film layer 34 is expanded and shrunk associated with charge and discharge, and therefore the thin film layer 34 easily separates from the anode active material layer 32. As examples of such a material, the material similar to in the first embodiment can be cited. As examples of particularly preferable material, the material similar to in the first embodiment can be cited.

Part of the thin film layer 34 can be oxidized. Further, the thin film layer 34 can be alloyed with the anode active material layer 32 at least in part of an interface with the anode active material layer 32. Separation of the thin film layer 34 from the anode active material layer 32 may be inhibited by securely bonding the thin film layer 34 and the anode active material layer 32 by alloying. However, excessive alloying leads to a large change in composition of the thin film layer 34, and therefore, target characteristics cannot be obtained. Therefore, it is preferable that the alloy of the foregoing composition is contained in the thin film layer 34 at least as part thereof.

The thin film layer 34 is preferably formed by at least one method from the group consisting of vapor-phase deposition method, liquid-phase deposition method, and sintering method. The reason thereof is that adhesion characteristics with the anode active material layer 32 can be improved, and the thin film layer 34 can be uniformly formed on the anode active material layer 32. Specially, vapor-phase deposition method is preferable, since the thin film layer 34 can be obtained more easily.

Such a thin film layer 34 can be made of a monolayer, or a plurality of layers. In the latter case, it is possible that a surface side of the thin film layer 34 is made of the foregoing alloy, and its side on the anode active material layer 32 is made of other metal materials. Further, it is enough that the thin film layer 34 is provided at least in part of a surface of the anode active material layer 32. It is not necessary that the thin film layer 34 is provided over a whole area of the anode active material layer 32. For example, the thin film layer 34 can be provided in the shape of an island, or can have an aperture for exposing the anode active material layer 32.

This anode 30 can be manufactured, for example, as follows.

First, for example, the anode current collector 31 made of a metal foil is prepared, and the anode active material layer 32 is formed on the anode current collector 31 by vapor-phase deposition method, liquid-phase deposition method, or sintering method, or by two or more thereof. Then, at least part of an interface between the anode current collector 31 and the anode active material layer 32 may be alloyed. In order to further alloy the anode current collector 31 and the anode active material layer 32, heat treatment can be further provided under a vacuum atmosphere or a non-oxidizing atmosphere. In particular, when the anode active material layer 32 is deposited by plating, alloying may be hard to arise. Therefore, in this case, it is preferable to conduct this heat treatment according to need. Further, when the anode active material layer 32 is deposited by vapor-phase deposition method, characteristics may be improved by further alloying the interface between the anode current collector 31 and the anode active material layer 32. Therefore, in this case, this heat treatment is preferably conducted. The vapor-phase deposition method, the liquid-phase deposition method, and the sintering method are as described in the first embodiment.

Further, the anode active material layer 32 can be formed by coating. However, it is more preferable to use vapor-phase deposition method, liquid-phase deposition method, or sintering method, since adhesive characteristics between the anode current collector 31 and the anode active material layer 32 can be improved, and alloying between the anode current collector 31 and the anode active material layer 32 often proceeds concurrently with forming the anode active material layer 32 as described above.

After the anode active material layer 32 is formed, the thin film layer 34 is formed on the anode active material layer 32 by, for example, vapor-phase deposition method, liquid-phase deposition method, or sintering method, or by two or more thereof. The thin film layer 34 is thereby uniformly formed on the anode active material layer 32. Specially, it is preferable to form the thin film layer 34 by vapor-phase deposition method, for example, vacuum deposition method or sputtering method. For example, when the sputtering method is used, it is possible to use a sputtering target consisting of an alloy previously adjusted to provide a target composition, or to use co-sputtering using a multitarget. Further, it is possible that after a thin film of nickel and a thin film of titanium are alternately layered, alloying is performed by heat treatment. Further, in order to obtain superelasticity and shape-memory effect, heating can be provided during deposition, or heat treatment can be provided under a non-oxidizing atmosphere after deposition. The anode 30 shown in FIG. 8 is thereby obtained.

Figure 9:
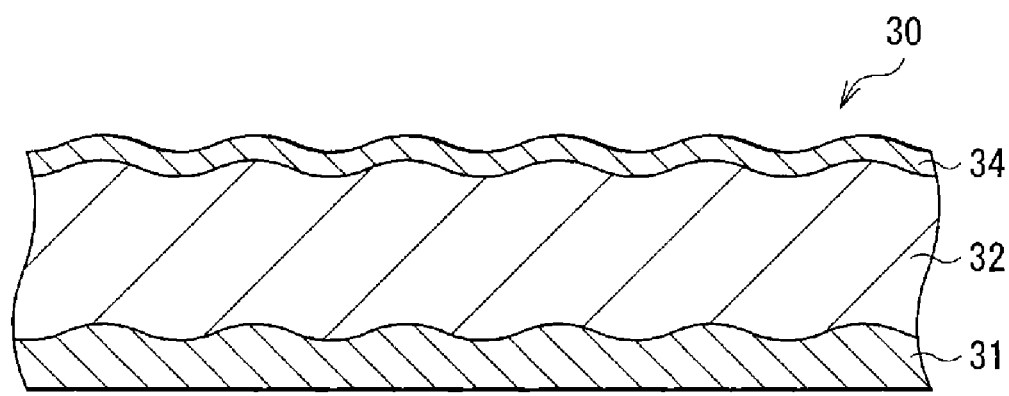
FIG. 9 is a cross section showing a construction example of the anode shown in FIG. 8.
Figure 10:
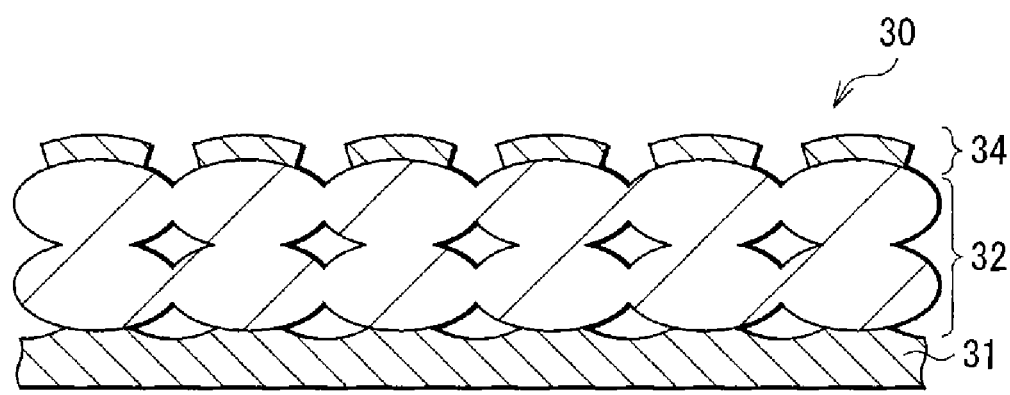
FIG. 10 is a cross section showing other construction example of the anode shown in FIG. 8.

When the anode active material layer 32 is formed by vapor-phase deposition method, liquid-phase deposition method, or coating, in many cases, the anode active material layer 32 is formed on a whole area of the anode current collector 31, for example, as shown in FIG. 9. Therefore, in many cases, the thin film layer 34 which is formed on the anode active material 32 is also formed on a whole area of the anode active material layer 32. Meanwhile, when the anode active material layer 32 is formed by sintering method, in many cases, clearances between the coated active material remains as voids in the anode active material layer 32. Therefore, in this case, the thin film layer 34 is often formed in part of the anode active material layer 32.

Figure 11:
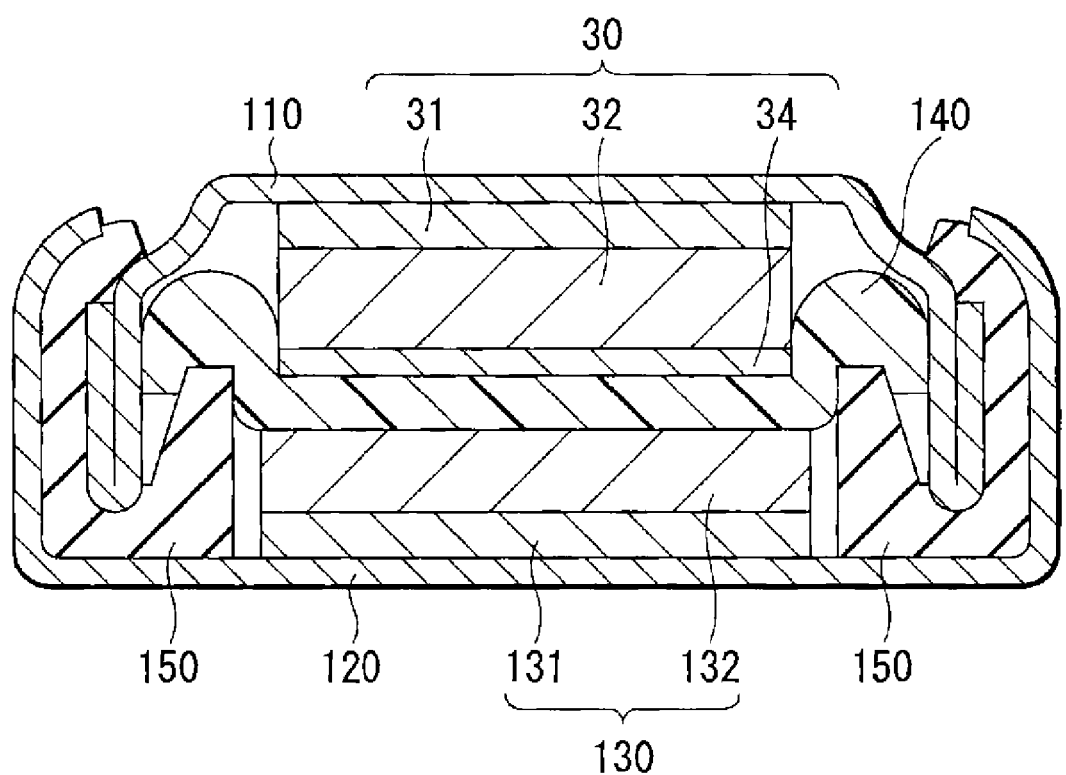
FIG. 11 is a cross section showing a construction of a secondary battery using the anode shown in FIG. 8.
Figure 12:
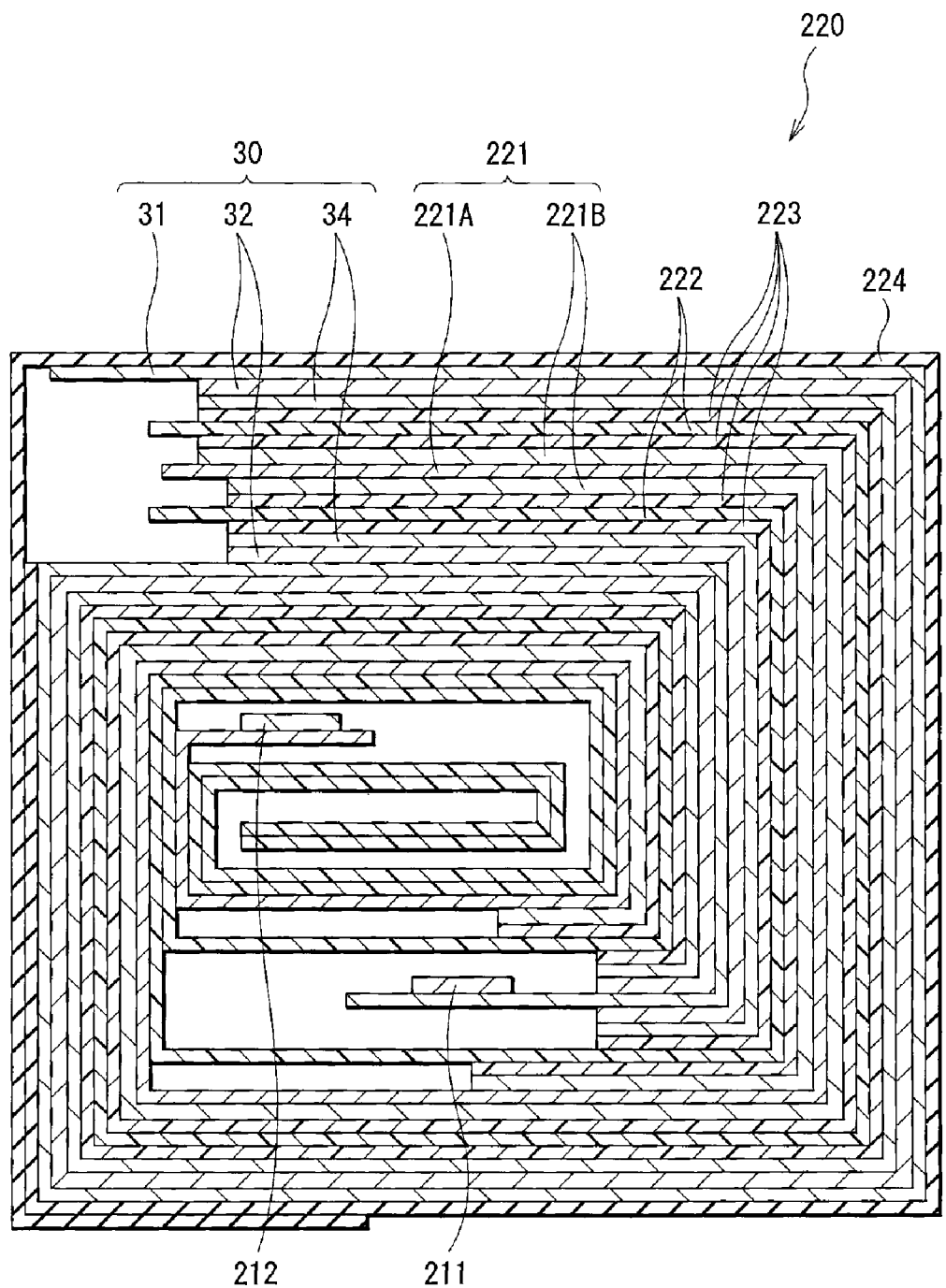
FIG. 12 is a cross section showing a construction of other secondary battery using the anode shown in FIG. 8.

This anode 30 can be used for secondary batteries similar to in the first embodiment, for example. That is, as shown in FIGS. 11 and 12, the secondary batteries in the third embodiment are the same as the secondary batteries shown in FIG. 2 or FIG. 4, except that the anode 30 is used instead of the anode 10.

In these secondary batteries, reaction between the anode active material layer 32 and an electrolyte is inhibited, and structural destruction of the anode active material layer 32 associated with expansion and shrinkage is inhibited by the thin film layer 34. Further, even if the anode active material layer 32 is expanded and shrunk, separation of the thin film layer 34 from the anode active material layer 32 is inhibited, since the thin film layer 34 contains the material having superelasticity or shape-memory effect. It is thinkable that lithium ions travels between an electrolytic solution and the anode active material layer 32 through cracks or pin holes of the thin film layer 34, or by diffusing themselves through the thin film layer 34 in the case that the thin film layer 34 is thin.

As above, in this embodiment, the anode active material layer 32 is provided with the thin film layer 34 containing the material having superelasticity or shape-memory effect. Therefore, reaction between the anode active material layer 32 and an electrolytic solution, and structural destruction of the anode active material layer 32 associated with expansion and shrinkage of the anode active material layer 32 can be inhibited. In addition, even when the anode active material layer 32 is expanded and shrunk, separation of the thin film layer 34 can be inhibited. In the result, cycle characteristics can be improved.

In particular, the material which does not form an intermetallic compound with lithium is contained as a material having superelasticity or shape-memory effect, it is possible to inhibit expansion and shrinkage of the thin film layer 34 associated with charge and discharge and separation of the thin film layer 34.

Further, when the thin film layer 34 contains nickel and titanium, higher effect can be obtained. In particular, when a composition ratio between nickel and titanium in the thin film layer 34 is nickel:titanium=49 to 52:51 to 48 or nickel:titanium=35 to 45:45 to 55 at an atomic ratio, further higher effect can be obtained.

EXAMPLES

Further, concrete examples of the invention will be hereinafter described with reference to the drawings. In the following examples, corresponding reference numbers and symbols used in the foregoing embodiments will be used without change.

Examples 1-1 to 1-6

The anodes 10 described in the first embodiment were fabricated. First, the interlayer 13 being 0.5 μm thick made of nickel-titanium alloy was formed on the anode current collector 11 being 15 μm thick made of a copper foil under the condition of heating to 300° C. or more by sputtering method using a nickel-titanium alloy target. Then, composition ratios between nickel and titanium in the interlayer 13 were changed in Examples 1-1 to 1-5 by conducting sputtering in which a nickel chip or a titanium chip was laid on the nickel-titanium alloy target. In Example 1-1, a ratio between nickel and titanium was 48:52 at an atomic ratio; in Example 1-2, a ratio between nickel and titanium was 49:51 at an atomic ratio; in Example 1-3, a ratio between nickel and titanium was 50.5: 49.5 at an atomic ratio; in Example 1-4, a ratio between nickel and titanium was 52:48 at an atomic ratio; and in Example 1-5, a ratio between nickel and titanium was 53:47 at an atomic ratio.

Next, the anode active material layer 12 being 5 μm thick made of silicon was formed on the interlayer 13 by sputtering method at room temperatures. The anodes 10 of Examples 1-1 to 1-5 were thereby obtained.

Subsequently, the coin type secondary batteries being 20 mm in diameter and 16 μm thick shown in FIG. 2 were fabricated by using the fabricated anodes 10 of Examples 1-1 to 1-5. The cathode 130 was fabricated as follows. Cobalt acid lithium ($LiCoO_2$) powders, a cathode active material being 5 μm in average particle diameter, carbon black as a conductive material, and polyvinylidene fluoride as a binder were mixed at a mass ratio of cobalt acid lithium:carbon black:polyvinylidene fluoride=92:3:5. The resultant mixture was put in N-methyl pyrrolidone as a disperse medium to obtain a mixture slurry. After that, the cathode current collector 131 being 15 μm thick made of aluminum was coated with the mixture slurry, dried, and pressurized to form the cathode active material layer 132. The cathode 130 was thereby fabricated. An electrolytic solution wherein $LiPF_6$ as a lithium salt was dissolved in a solvent in which ethylene carbonate and dimethyl carbonate were mixed at a mass ratio of 1:1, so that the $LiPF_6$ became 1.0 mol/dm$^3$ was used. As the separator 140, a polypropylene film was used.

Regarding the fabricated secondary batteries of Examples 1-1 to 1-5, a charge and discharge test was conducted under the condition of 25° C., and capacity retention ratios at the 50th cycle were obtained. Then, charge was conducted until a battery voltage reached 4.2 V at a constant current density of 1 mA/cm$^2$, and then charge was conducted until a current density reached 0.02 mA/cm$^2$ at a constant voltage of 4.2 V. Discharge was conducted until a battery voltage reached 2.5 V at a constant current density of 1 mA/cm$^2$. When charge was conducted, an anode utilization ratio at the initial charge was set to 90% based on charge and discharge capacities of the anode 10 and the cathode 130 previously obtained by actual measurement and calculation to prevent metallic lithium from being precipitated. The capacity retention ratio at the 50th cycle was calculated as a proportion of a discharge capacity at the 50th cycle to an initial discharge capacity, that is, (discharge capacity at the 50th cycle/initial discharge capacity)×100. Obtained results are shown in Table 1.

TABLE 1

| | Anode current collector | Interlayer (atomic ratio) | Anode active material | Capacity retention ratio (%) |
|---|---|---|---|---|
| Example 1-1 | Cu | Ni48:Ti52 | Si | 75 |
| Example 1-2 | Cu | Ni49:Ti51 | Si | 87 |
| Example 1-3 | Cu | Ni50.5:Ti49.5 | Si | 92 |
| Example 1-4 | Cu | Ni52:Ti48 | Si | 83 |
| Example 1-5 | Cu | Ni53:Ti47 | Si | 74 |
| Comparative example 1-1 | Cu | — | Si | 71 |
| Comparative example 1-2 | Cu | Ni | Si | 67 |
| Comparative example 1-3 | Cu | Ti | Si | 63 |

As Comparative example 1-1 to Examples 1-1 to 1-5, an anode was formed and a secondary battery was fabricated as in Examples 1-1 to 1-5, except that the interlayer was not formed. Further, as Comparative examples 1-2 and 1-3 to Examples 1-1 to 1-5, anodes were formed and secondary batteries were fabricated as in Examples 1-1 to 1-5, except that interlayers were formed of nickel or titanium. Regarding the secondary batteries of Comparative examples 1-1 to 1-3, the charge and discharge test was also conducted, and capacity retention ratios thereof at the 50th cycle were obtained as in Examples 1-1 to 1-5. Results thereof are shown in Table 1 as well.

As evidenced by Table 1, according to Examples 1-1 to 1-5, wherein the interlayer 13 containing the nickel-titanium alloy having superelasticity or shape-memory effect was provided, higher capacity retention ratios were obtained compared to Comparative example 1-1, wherein the interlayer was not formed and Comparative examples 1-2 and 1-3, wherein the interlayer was formed by nickel or titanium. That is, it was found that when the interlayer 13 containing the material having superelasticity or shape-memory effect, or the interlayer 13 containing nickel and titanium was provided, cycle characteristics could be improved.

Further, as evidenced by comparison among Examples 1-1 to 1-5, when a composition ratio of nickel to titanium was raised, a trend was shown that the capacity retention ratio was increased, showed the maximum value, and then was decreased. That is, it was found that higher effect could be obtained when a composition ratio between nickel and titanium in the interlayer 13 was nickel:titanium=49 to 52:51 to 48 at an atomic ratio.

Examples 2-1 to 2-5

The anodes 10 were formed and secondary batteries were fabricated as in Examples 1-1 to 1-5, except that the anode active material layer 12 was formed of germanium. Regarding respective composition ratios between nickel and titanium in the interlayer 13, in Example 2-1, the ratio between nickel and titanium was 48:52 at an atomic ratio; in Example 2-2, the ratio between nickel and titanium was 49:51 at an atomic ratio; in Example 2-3, the ratio between nickel and titanium was 50.5:49.5 at an atomic ratio; in Example 2-4, the ratio between nickel and titanium was 52:48 at an atomic ratio; and in Example 2-5, the ratio between nickel and titanium was 53:47 at an atomic ratio. Further, as Comparative example 2-1 to Examples 2-1 to 2-5, an anode was formed and a secondary battery was fabricated as in Examples 2-1 to 2-5, except that the interlayer was not formed. Further, as Comparative examples 2-2 and 2-3 to Examples 2-1 to 2-5, anodes were formed and secondary batteries were fabricated as in Examples 2-1 to 2-5, except that interlayers were formed by nickel or titanium. Regarding the secondary batteries of Examples 2-1 to 2-5 and Comparative examples 2-1 to 2-3, the charge and discharge test was also conducted, and capacity retention ratios thereof at the 50th cycle were obtained as in Examples 1-1 to 1-5. Results thereof are shown in Table 2.

TABLE 2

| | Anode current collector | Interlayer (atomic ratio) | Anode active material | Capacity retention ratio (%) |
|---|---|---|---|---|
| Example 2-1 | Cu | Ni48:Ti52 | Ge | 74 |
| Example 2-2 | Cu | Ni49:Ti51 | Ge | 85 |
| Example 2-3 | Cu | Ni50.5:Ti49.5 | Ge | 90 |
| Example 2-4 | Cu | Ni52:Ti48 | Ge | 82 |
| Example 2-5 | Cu | Ni53:Ti47 | Ge | 74 |
| Comparative example 2-1 | Cu | — | Ge | 68 |
| Comparative example 2-2 | Cu | Ni | Ge | 65 |
| Comparative example 2-3 | Cu | Ti | Ge | 66 |

As evidenced by Table 2, according to Examples 2-1 to 2-5, wherein the interlayer 13 containing the nickel-titanium alloy having superelasticity or shape-memory effect was provided, higher capacity retention ratios were obtained compared to Comparative example 2-1, wherein the interlayer 13 was not formed and Comparative examples 2-2 and 2-3, wherein the interlayer was formed by nickel or titanium. Further, as evidenced by comparison among Examples 2-1 to 2-5, when a composition ratio of nickel to titanium is raised, a trend was shown that the capacity retention ratio was increased, showed the maximum value, and then was decreased. That is, it was found that even if germanium was used for the anode active material, cycle characteristics could be improved as in the case of using silicon as long as the interlayer 13 containing the material having superelasticity or shape-memory effect, or the interlayer 13 containing nickel and titanium was provided. Further, it was found that higher effect could be obtained when a composition ratio between nickel and titanium in the interlayer 13 was nickel:titanium=49 to 52:51 to 48 at an atomic ratio.

Example 3-1

The anode 10 was formed as in Example 1-3. That is, the interlayer 13 being 0.5 μm thick made of nickel-titanium alloy was formed on the anode current collector 11 being 15 μm thick made of a copper foil under the condition of heating to 300° C. or more by sputtering method. Next, the anode active material layer 12 being 5 μm thick made of silicon was formed on the interlayer 13 by sputtering method at room temperatures. A composition ratio between nickel and titanium in the interlayer 13 was set to nickel:titanium=50.5:49.5 at an atomic ratio. Further, as Comparative example 3-1 to Example 3-1, an anode was formed as in Example 3-1, except that an interlayer was not formed.

Subsequently, the secondary batteries shown in FIGS. 3 and 4 were fabricated by using the fabricated anodes 10 of Example 3-1 and Comparative example 3-1. Then, the cathode 221 was fabricated as in Example 1-3. The electrolyte layer 223 was formed as follows. That is, the anode 10 and the cathode 221 were coated with a precursor solution, wherein 10 wt % of polyvinylidene fluoride, which is a block copolymer having 0.6 million weight-average molecular weight, and 60 wt % of dimethyl carbonate were mixed and dissolved in 30 wt % of an electrolytic solution consisting of 42.5 wt % of ethylene carbonate, 42.5 wt % of propylene carbonate, and 15 wt % of LiPF$_6$ as a lithium salt. The resultant was left for eight hours at ambient temperatures, and dimethyl carbonate was volatilized. The electrolyte layer 223 was thereby formed. Regarding the obtained secondary batteries of Examples 3-1 and Comparative example 3-1, the charge and discharge test was conducted, and capacity retention ratios at the 50th cycle were obtained as in Example 1-3. The results are shown in Table 3.

TABLE 3

| | Anode current collector | Interlayer (atomic ratio) | Anode active material | Capacity retention ratio (%) |
|---|---|---|---|---|
| Example 3-1 | Cu | Ni50.5:Ti49.5 | Si | 93 |
| Comparative example 3-1 | Cu | — | Si | 73 |

As evidenced by Table 3, according to Example 3-1, wherein the interlayer 13 was formed, a higher capacity retention ratio was obtained compared to Comparative example 3-1, wherein the interlayer was not formed. That is, it was confirmed that the similar result could be obtained even if the gelatinous electrolyte was used.

In the foregoing examples, the case wherein the interlayer 13 contained the nickel-titanium alloy was described. However, when the interlayer 13 contains other material having superelasticity or shape-memory effect, a similar result can be obtained. Further, when the anode active material layer 12 or the interlayer 13 is formed by vapor-phase deposition method, liquid-phase deposition method, or sintering method, instead of sputtering method, a similar result can be obtained.

Examples 4-1 to 4-5

The anodes 20 described in the second embodiment were fabricated. First, a nickel-titanium alloy foil being 50 μm thick was prepared. After a surface of the nickel-titanium alloy foil was lapped by lapping process, degreasing cleaning was conducted. Then, each surface roughness was changed in Examples 4-1 to 4-5. Regarding the nickel-titanium alloy foil after being provided with surface roughness process, a ten points average roughness Rz was measured. The ten points average roughness Rz was 0.8 μm for Example 4-1, 1.2 μm for Example 4-2, 2.0 μm for Example 4-3, 2.5 μm for Example 4-4, and 3.6 μm for Example 4-5.

Next, this nickel-titanium alloy foil was used as the anode current collector 21, and the anode active material layer 22 being 5 μm thick made of silicon was formed by sputtering method. The anodes 20 of Examples 4-1 to 4-5 were thereby obtained.

Subsequently, the coin type secondary batteries being 20 mm in diameter and 16 μm thick shown in FIG. 6 were fabricated by using the fabricated anodes 20 of Examples 4-1 to 4-5. The cathode 130 was fabricated as follows. Cobalt acid lithium ($LiCoO_2$) powders being 5 μm in average particle diameter as a cathode active material; carbon black as a conductive material; and polyvinylidene fluoride as a binder were mixed at a mass ratio of cobalt acid lithium:carbon black:polyvinylidene fluoride=92:3:5. The resultant mixture was put in N-methyl pyrrolidone as a disperse medium to obtain a mixture slurry. After that, the cathode current collector 131 being 15 μm thick made of aluminum was coated with the mixture slurry, dried, and pressurized to form the cathode active material layer 132. The cathode 130 was thereby fabricated. As an electrolytic solution, an electrolytic solution wherein $LiPF_6$ as a lithium salt was dissolved in a solvent in which ethylene carbonate and dimethyl carbonate were mixed at a mass ratio of 1:1, so that the $LiPF_6$ became 1.0 mol/$dm^3$ was used. As the separator 140, a polypropylene film was used.

Regarding the fabricated secondary batteries of Examples 4-1 to 4-5, a charge and discharge test was conducted under the condition of 25° C., and capacity retention ratios at the 50th cycle were obtained. Then, charge was conducted until a battery voltage reached 4.2 V at a constant current density of 1 mA/$cm^2$, and then charge was conducted until a current density reached 0.02 mA/$cm^2$ at a constant voltage of 4.2 V. Discharge was conducted until a battery voltage reached 2.5 V at a constant current density of 1 mA/$cm^2$. When charge was conducted, an anode utilization ratio at the initial charge was set to 90% based on charge and discharge capacities of the anode 30 and the cathode 130 previously obtained by actual measurement and calculation to prevent metallic lithium from being precipitated. The capacity retention ratio at the 50th cycle was calculated as a proportion of a discharge capacity at the 50th cycle to an initial discharge capacity, that is, (discharge capacity at the 50th cycle/initial discharge capacity)×100. Obtained results are shown in Table 4.

TABLE 4

| | Anode current collector (lapping process) | | Anode active material | Capacity retention ratio (%) |
|---|---|---|---|---|
| | Material | Ten points average roughness Rz (μm) | | |
| Example 4-1 | NiTi alloy | 0.8 | Si | 78 |
| Example 4-2 | NiTi alloy | 1.2 | Si | 84 |
| Example 4-3 | NiTi alloy | 2.0 | Si | 87 |
| Example 4-4 | NiTi alloy | 2.5 | Si | 89 |
| Example 4-5 | NiTi alloy | 3.6 | Si | 82 |
| Comparative example 4-1 | Cu | 0.8 | Si | 2 |
| Comparative example 4-2 | Cu | 2.5 | Si | 66 |
| Comparative example 4-3 | Ni | 2.5 | Si | 48 |
| Comparative example 4-4 | Ti | 2.5 | Si | 42 |

As Comparative examples 4-1 to 4-4 to Examples 4-1 to 4-5, anodes were formed and secondary batteries were fabricated as in Examples 4-1 to 4-5, except that the anode current collector was changed. Then, a copper foil was used for Comparative examples 4-1 and 4-2, a nickel foil was used for Comparative example 4-3, and a titanium foil was used for Comparative example 4-4. Ten points roughness Rz for the anode current collector was 0.8 μm for Comparative example 4-1, and 2.5 μm for Comparative examples 4-2 to 4-4. Regarding the secondary batteries of Comparative examples 4-1 to 4-4, the charge and discharge test was also conducted, and capacity retention ratios thereof at the 50th cycle were obtained as in Examples 4-1 to 4-5. Results thereof are shown in Table 4 as well.

As evidenced by Table 4, according to Examples 4-1 to 4-5, wherein the anode current collector 21 was formed of the nickel-titanium alloy having superelasticity or shape-memory effect, higher capacity retention ratios were obtained compared to Comparative examples 4-1 to 4-4, wherein other materials were used. It is thinkable that the reason thereof was as follows. In Comparative examples 4-1 to 4-4, the anode active material layer was separated from the anode current collector due to expansion and shrinkage of the anode active material layer associated with charge and discharge. Meanwhile, in Examples 4-1 to 4-5, contact characteristics between the anode current collector 21 and the anode active material layer 22 was strong, and the anode current collector 21 had high flexibility. Therefore, stress due to expansion and shrinkage of the anode active material layer 22 could be relaxed, and separation of the anode active material layer 22 could be inhibited. That is, it was found that when the anode current collector 21 contained the material having superelasticity or shape-memory effect, or nickel and titanium, cycle characteristics could be improved.

Further, from the results of Examples 4-1 to 4-5, it was found that higher capacity retention ratios could be obtained when the ten points roughness Rz for the anode current collector 21 was 0.8 μm or more, more particularly 1.2 μm or more. It is thinkable that the reason thereof is as follows. When the ten points roughness Rz was within the foregoing range, cracks due to expansion and shrinkage of the anode active material layer 22 could be controlled as an appropriate shape.

Example 5-1

An anode 20 was formed and a secondary battery was fabricated as in Examples 4-1 to 4-5, except that a nickel-titanium alloy foil being 50 μm thick was degreased and cleaned, and projecting parts of copper were formed on a surface of this nickel-titanium alloy foil by plating to prepare the anode current collector 21. Regarding the anode current collector 21 after the projecting parts were formed, a ten points average roughness Rz was measured and it was 2.4 μm.

As Comparative example 5-1 to Example 5-1, an anode was formed and a secondary battery was fabricated as in Examples 4-1 to 4-5, except that an anode current collector wherein projecting parts of copper were formed by plating on a surface of a copper foil being 50 μm thick was used. Regarding the anode current collector of Comparative example 5-1 after the projecting parts were formed, a ten points average roughness Rz was measured and it was 2.4 μm.

Regarding the secondary batteries of Example 5-1 and Comparative example 5-1, a charge and discharge test was conducted, and capacity retention ratios at the 50th cycle were obtained as in Examples 4-1 to 4-5. The results are shown in Table 5.

TABLE 5

| | Anode current collector (with projecting parts) | | | |
|---|---|---|---|---|
| | Material for base | Ten points average roughness Rz (μm) | Anode active material | Capacity retention ratio (%) |
| Example 5-1 | NiTi alloy | 2.4 | Si | 92 |
| Comparative example 5-1 | Cu | 2.4 | Si | 68 |

As evidenced by Table 5, as in Examples 4-1 to 4-5, according to Example 5-1, a higher capacity retention ratio was obtained compared to Comparative example 5-1. That is, it was found that even if the anode current collector 21 wherein the projecting parts were formed on the base was used, cycle characteristics could be improved as long as nickel and titanium were contained as the material having superelasticity or shape-memory effect was contained.

Examples 6-1 to 6-5

Anodes 20 were formed and secondary batteries were fabricated as in Examples 4-1 to 4-5, except that the anode active material layer 22 was formed by germanium. Ten points average roughness Rz of the anode current collector 21 was 0.8 μm for Example 6-1, 1.2 μm for Example 6-2, 2.0 μm for Example 6-3, 2.5 μm for Example 6-4, and 3.6 μm for Example 6-5. As Comparative examples 6-1 to 6-4 to Examples 6-1 to 6-5, anodes were formed and secondary batteries were fabricated as in Examples 6-1 to 6-5, except that anode current collectors were changed. A copper foil was used for Comparative examples 6-1 and 6-2, a nickel foil was used for Comparative example 6-3, and a titanium foil was used for Comparative example 6-4. A ten points average roughness Rz was 0.8 μm for Comparative example 6-1, and 2.5 μm for Comparative examples 6-2 to 6-4. Regarding the secondary batteries of Examples 6-1 to 6-5 and Comparative examples 6-1 to 6-4, a charge and discharge test was conducted, and capacity retention ratios at the 50th cycle were obtained as in Examples 4-1 to 4-5. The results are shown in Table 6.

TABLE 6

| | Anode current collector (lapping process) | | | |
|---|---|---|---|---|
| | Material | Ten points average roughness Rz (μm) | Anode active material | Capacity retention ratio (%) |
| Example 6-1 | NiTi alloy | 0.8 | Ge | 73 |
| Example 6-2 | NiTi alloy | 1.2 | Ge | 80 |
| Example 6-3 | NiTi alloy | 2.0 | Ge | 83 |
| Example 6-4 | NiTi alloy | 2.5 | Ge | 86 |
| Example 6-5 | NiTi alloy | 3.6 | Ge | 80 |
| Comparative example 6-1 | Cu | 0.8 | Ge | 3 |
| Comparative example 6-2 | Cu | 2.5 | Ge | 63 |
| Comparative example 6-3 | Ni | 2.5 | Ge | 43 |
| Comparative example 6-4 | Ti | 2.5 | Ge | 42 |

As evidenced by Table 6, as in Examples 4-1 to 4-5, according to Examples 6-1 to 6-5, wherein the anode current collector 21 was formed by the nickel-titanium alloy having superelasticity or shape-memory effect, higher capacity retention ratios were obtained compared to Comparative examples 6-1 to 6-4, wherein other materials were used. Further, it was found that higher capacity retention ratios could be obtained when the ten points roughness Rz for the anode current collector 21 was 0.8 μm or more, or more particularly 1.2 μm or more. That is, it was found that as in the case of using silicon, even if germanium was used for the anode active material, cycle characteristics could be improved as long as the anode current collector 21 contains the material having superelasticity or shape-memory effect, or nickel and titanium. Further, it was found that when the ten points roughness Rz for the anode current collector 21 was 0.8 μm or more, or more particularly 1.2 μm or more, cycle characteristics could be further improved.

Example 7-1

An anode 20 was formed and a secondary battery was fabricated as in Example 5-1, except that the anode active material layer 22 was formed by germanium. That is, the anode current collector 21 wherein projecting parts of copper were formed on a surface of a nickel-titanium alloy foil being 50 μm thick was used, and the anode active material layer 22 of germanium was formed. Regarding the anode current collector 21 of Example 7-1 after the projecting parts were formed, a ten points average roughness Rz was measured and it was 2.4 μm.

As Comparative example 7-1 to Example 7-1, an anode was formed and a secondary battery was fabricated as in Example 7-1, except that an anode current collector wherein projecting parts of copper were formed by plating on a surface of a copper foil being 50 μm thick was used. Regarding the anode current collector of Comparative example 7-1 after the projecting parts were formed, a ten points average roughness Rz was measured and it was 2.4 μm.

Regarding the secondary batteries of Example 7-1 and Comparative example 7-1, a charge and discharge test was conducted, and capacity retention ratios at the 50th cycle were obtained as in Examples 4-1 to 4-5. The results are shown in Table 7.

TABLE 7

| | Anode current collector (with projecting parts) | | | |
|---|---|---|---|---|
| | Material for base | Ten points average roughness Rz (μm) | Anode active material | Capacity retention ratio (%) |
| Example 7-1 | NiTi alloy | 2.4 | Ge | 88 |
| Comparative example 7-1 | Cu | 2.4 | Ge | 63 |

As evidenced by Table 7, as in Examples 4-1 to 4-5, according to Example 7-1, a higher capacity retention ratio was obtained compared to Comparative example 7-1. That is, it was found that even if the anode current collector 21 wherein the projecting parts were formed on the base was used and germanium was used for the anode active material, cycle characteristics could be improved as long as the anode current collector 21 contained nickel and titanium, as the anode current collector 21 contained the material having superelasticity or memory shape effect.

In the foregoing example, the case wherein the anode current collector 21 contained the nickel-titanium alloy has been described. However, when other material having superelasticity or shape-memory effect is contained, a similar result can be obtained. Further, when the anode active material layer 22 is formed by vapor-phase deposition method, liquid-phase deposition method, or sintering method instead of sputtering method, a similar result can be obtained.

Examples 8-1 to 8-5

The anode 30 described in the third embodiment was fabricated. First, the anode active material layer 32 being 5 μm thick made of silicon was formed on the anode current collector 31 being 15 μm thick made of copper by sputtering method. Next, a thin film layer 34 being 0.2 μm thick made of nickel-titanium alloy was formed on the anode active material layer 32 under the condition of heating to 300° C. or more by sputtering method using a nickel-titanium alloy target. Then, composition ratios between nickel and titanium in the thin film layer 34 were changed in Examples 8-1 to 8-5 by conducting sputtering in which a nickel chip or a titanium chip was laid on the nickel-titanium alloy target. In Example 8-1, a ratio between nickel and titanium was 48:52 at an atomic ratio; in Example 8-2, a ratio between nickel and titanium was 49:51 at an atomic ratio; in Example 8-3, a ratio between nickel and titanium was 50.5:49.5 at an atomic ratio; in Example 8-4, a ratio between nickel and titanium was 52:48 at an atomic ratio; and in Example 8-5, a ratio between nickel and titanium was 53:47 at an atomic ratio. The anodes 30 of Examples 8-1 to 8-5 were thereby obtained.

Subsequently, the coin type secondary batteries being 20 mm in diameter and 16 mm thick shown in FIG. 11 were fabricated by using the fabricated anodes 30 of Examples 8-1 to 8-5. The cathode 130 was fabricated as follows. Cobalt acid lithium ($LiCoO_2$) powders as a cathode active material being 5 μm in average particle diameter; carbon black as a conductive material; and polyvinylidene fluoride as a binder were mixed at a mass ratio of cobalt acid lithium:carbon black:polyvinylidene fluoride=92:3:5. The resultant mixture was put in N-methyl pyrrolidone as a disperse medium to obtain a mixture slurry. After that, the cathode current collector 131 being 15 μm thick made of aluminum was coated with the mixture slurry, dried, and pressurized to form the cathode active material layer 132. The cathode 130 was thereby fabricated. As an electrolytic solution, an electrolytic solution wherein $LiPF_6$ as a lithium salt was dissolved in a solvent in which ethylene carbonate and dimethyl carbonate were mixed at a mass ratio of 1:1, so that the $LiPF_6$ became 1.0 mol/$dm^3$ was used. As the separator 140, a polypropylene film was used.

Regarding the fabricated secondary batteries of Examples 8-1 to 8-5, a charge and discharge test was conducted under the condition of 25° C., and capacity retention ratios at the 50th cycle were obtained. Then, charge was conducted until a battery voltage reached 4.2 V at a constant current density of 1 mA/$cm^2$, and then charge was conducted until a current density reached 0.02 mA/$cm^2$ at a constant voltage of 4.2 V. Discharge was conducted until a battery voltage reached 2.5 V at a constant density of 1 mA/$cm^2$. When charge was conducted, an anode utilization ratio at the initial charge was set to 90% based on charge and discharge capacities of the anode 30 and the cathode 130 previously obtained by actual measurement and calculation to prevent metallic lithium from being precipitated. The capacity retention ratio at the 50th cycle was calculated as a proportion of a discharge capacity at the 50th cycle to an initial discharge capacity, that is, (discharge capacity at the 50th cycle/initial discharge capacity)× 100. Obtained results are shown in Table 8.

TABLE 8

| | Anode current collector | Anode active material | Thin film layer (atomic ratio) | Capacity retention ratio (%) |
|---|---|---|---|---|
| Example 8-1 | Cu | Si | Ni48:Ti52 | 78 |
| Example 8-2 | Cu | Si | Ni49:Ti51 | 84 |
| Example 8-3 | Cu | Si | Ni50.5:Ti49.5 | 88 |
| Example 8-4 | Cu | Si | Ni52:Ti48 | 83 |
| Example 8-5 | Cu | Si | Ni53:Ti47 | 76 |
| Comparative example 8-1 | Cu | Si | — | 71 |
| Comparative example 8-2 | Cu | Si | Cu | 74 |
| Comparative example 8-3 | Cu | Si | Ni | 74 |

As Comparative example 8-1 to Examples 8-1 to 8-5, an anode was formed and a secondary battery was fabricated as in Examples 8-1 to 8-5, except that the thin film layer was not formed. As Comparative examples 8-2 and 8-3 to Examples 8-1 to 8-5, anodes were formed and secondary batteries were fabricated as in Examples 8-1 to 8-5, except that the thin film layer was formed by copper or nickel. Regarding the secondary batteries of Comparative examples 8-1 to 8-3, the charge and discharge test was also conducted, and capacity retention ratios thereof at the 50th cycle were obtained as in Examples 8-1 to 8-5. Results thereof are shown in Table 8 as well.

As evidenced by Table 8, according to Examples 8-1 to 8-5, wherein the thin film layer 34 containing the nickel-titanium alloy having superelasticity or shape-memory effect was provided, higher capacity retention ratios were obtained compared to Comparative example 8-1, wherein the thin film layer was not formed and Comparative examples 8-2 and 8-3, wherein the thin film layer was formed by copper or nickel. That is, it was found that when the thin film layer 34 containing the material having superelasticity or shape-memory effect, or the thin film layer 34 containing nickel and titanium is provided, cycle characteristics could be improved.

Further, as evidenced by comparison among Examples 8-1 to 8-5, when a composition ratio of nickel to titanium was raised, a trend was shown that the capacity retention ratio was increased, showed the maximum value, and then was decreased. That is, it was found that higher effect could be obtained when a composition ratio between nickel and titanium in the thin film layer 34 was nickel:titanium=49 to 52:51 to 48 at an atomic ratio.

Examples 9-1 to 9-5

The anodes 30 were formed and secondary batteries were fabricated as in Examples 8-1 to 8-5, except that the anode active material layer 32 was formed by germanium. Regarding respective composition ratios between nickel and titanium in the thin film layer 34, in Example 9-1, the ratio between nickel and titanium was 48:52 at an atomic ratio; in Example 9-2, the ratio between nickel and titanium was 49:51 at an atomic ratio; in Example 9-3, the ratio between nickel and titanium was 50.5:49.5 at an atomic ratio; in Example 9-4, the ratio between nickel and titanium was 52:48 at an atomic ratio; and in Example 9-5, the ratio between nickel and titanium was 53:47 at an atomic ratio. Further, as Comparative example 9-1 to Examples 9-1 to 9-5, an anode was formed and a secondary battery was fabricated as in Examples 9-1 to 9-5, except that the thin film layer was not formed. Further, as Comparative examples 9-2 and 9-3 to Examples 9-1 to 9-5, anodes were formed and secondary batteries were fabricated as in Examples 9-1 to 9-5, except that thin film layers were formed by copper or nickel. Regarding the secondary batteries of examples 9-1 to 9-5 and Comparative examples 9-1 to 9-3, the charge and discharge test was also conducted, and capacity retention ratios thereof at the 50th cycle were obtained as in Examples 9-1 to 9-5. Results thereof are shown in Table 9.

TABLE 9

| | Anode current collector | Anode active material | Thin film layer (atomic ratio) | Capacity retention ratio (%) |
|---|---|---|---|---|
| Example 9-1 | Cu | Ge | Ni48:Ti52 | 75 |
| Example 9-2 | Cu | Ge | Ni49:Ti51 | 82 |
| Example 9-3 | Cu | Ge | Ni50.5:Ti49.5 | 85 |
| Example 9-4 | Cu | Ge | Ni52:Ti48 | 81 |
| Example 9-5 | Cu | Ge | Ni53:Ti47 | 74 |
| Comparative example 9-1 | Cu | Ge | — | 68 |
| Comparative example 9-2 | Cu | Ge | Cu | 72 |
| Comparative example 9-3 | Cu | Ge | Ni | 71 |

As evidenced by Table 9, according to Examples 9-1 to 9-5, wherein the thin film layer 34 containing the nickel-titanium alloy having superelasticity or shape-memory effect was provided, higher capacity retention ratios were obtained compared to Comparative example 9-1, wherein the thin film layer was not formed and Comparative examples 9-2 and 9-3, wherein the thin film layer was formed by copper or nickel. Further, as evidenced by comparison among Examples 9-1 to 9-5, when a composition ratio of nickel to titanium was raised, a trend was shown that the capacity retention ratio was increased, showed the maximum value, and then was decreased. That is, it was found that even if germanium was used for the anode active material, cycle characteristics could be improved as the case of using silicon, as long as the thin film layer 34 containing the material having superelasticity or shape-memory effect, or the thin film layer 34 containing nickel and titanium was provided. Further, it was found that higher effect could be obtained when a composition ratio between nickel and titanium in the thin film layer 34 was nickel:titanium=49 to 52:51 to 48 at an atomic ratio.

Example 10-1

The anode 30 was formed as in Example 8-3. That is, the anode active material layer 32 being 5 μm thick made of silicon was formed by sputtering method on the anode current collector 31 being 15 μm thick made of a copper foil. Next, the thin film layer 34 being 0.2 μm thick made of nickel-titanium alloy was formed on the anode active material layer 32 under the condition of heating to 300° C. or more by sputtering method. A composition ratio between nickel and titanium in the thin film layer 34 was set to nickel:titanium=50.5:49.5 at an atomic ratio. Further, as Comparative example 10-1 to Example 10-1, an anode was formed as in Example 10-1, except that the thin film layer was not formed.

Subsequently, the secondary batteries shown in FIGS. 3 and 12 were fabricated by using the fabricated anodes 30 of Example 10-1 and Comparative example 10-1. Then, the cathode 221 was fabricated as in Example 8-3. The electrolyte layer 223 was formed as follows. That is, the anode 30 and the cathode 221 were respectively coated with a precursor solution, wherein 10 wt % of polyvinylidene fluoride, which is a block copolymer having 0.6 million weight-average molecular weight, and 60 wt % of dimethyl carbonate were mixed and dissolved in 30 wt % of an electrolytic solution consisting of 42.5 wt % of ethylene carbonate, 42.5 wt % of propylene carbonate, and 15 wt % of $LiPF_6$ as a lithium salt. The resultant was left for eight hours at ambient temperatures, and dimethyl carbonate was volatilized. The electrolyte layer 223 was thereby formed. Regarding the obtained secondary batteries of Examples 10-1 and Comparative example 10-1, the charge and discharge test was conducted, and capacity retention ratios at the 50th cycle were obtained as in Example 8-3. The results are shown in Table 10.

TABLE 10

| | Anode current collector | Anode active material | Thin film layer (atomic ratio) | Capacity retention ratio (%) |
|---|---|---|---|---|
| Example 10-1 | Cu | Si | Ni50.5:Ti49.5 | 90 |
| Comparative example 10-1 | Cu | Si | — | 73 |

As evidenced by Table 10, according to Example 10-1, wherein the thin film layer 34 was formed, a higher capacity retention ratio was obtained compared to Comparative example 10-1, wherein the thin film layer was not formed. That is, it was confirmed that the similar result could be obtained even if the gelatinous electrolyte was used.

In the foregoing examples, the case wherein the thin film layer 34 contained the nickel-titanium alloy has been described. However, when the thin film layer 34 contains other material having superelasticity or shape-memory effect, a similar result can be obtained. Further, when the anode active material layer 32 or the thin film layer 34 is formed by vapor-phase deposition method, liquid-phase deposition method, or sintering method, instead of the sputtering method, a similar result can be obtained.

While the invention has been described with reference to the embodiments and Examples, the invention is not limited to the foregoing embodiments and Examples, and various modifications may be made. For example, in the foregoing embodiments and Examples, descriptions have been given of the case wherein the high molecular weight material was used as a holding body. However, an inorganic conductor containing lithium nitride or phosphoric acid lithium can be used as a holding body. Further, a mixture of a high molecular weight material and an inorganic conductor can be used.

Further, in the foregoing embodiment and Examples, the anode 10 wherein the anode current collector 11 is provided with the anode active material layer 12 with the interlayer 13 in between has been described. However, other layers can be further provided. For example, other layer can be provided between the anode current collector 11 and the interlayer 13. Further, as described in the foregoing embodiment, other layer can be provided between the interlayer 13 and the anode active material layer 12. Further, other layer can be provided on the anode active material layer 12.

In the foregoing embodiment and Examples, the anode 20 wherein the anode current collector 21 is provided with the anode active material layer 22 has been described. However, other layers can be provided between the anode current collector 21 and the anode active material layer 22.

In addition, in the foregoing embodiment and Examples, the anode 30 wherein the anode current collector 31 is provided with the anode active material layer 32 and the thin film layer 34 has been described. However, other layers can be provided between the anode current collector 31 and the anode active material layer 32. Further, other layers can be provided between the anode active material layer 32 and the thin film layer 34.

Further, in the foregoing embodiments and Examples, the coin type and the winding laminated type secondary batteries have been described. However, the invention can be applied similarly to secondary batteries such as cylinder type, square type, button type, thin type, large type and multilayer laminated type secondary batteries. Further, the invention can be applied not only to the secondary batteries, but also to primary batteries.

Obviously many modifications and variations of the present invention are possible in the light of the above teachings. It is therefore to be understood that within the scope of the appended claims the invention may be practiced otherwise than as specifically described.

What is claimed is:

1. An anode comprising:
an anode current collector;
an anode active material layer on one side of said anode current collector; and
a thin film layer containing a super-elastic or shape-memory effect material on a side of said anode current collector opposite that with active material layer and in contact with said anode active material,
wherein,
the anode active material forms an alloy with lithium,
the anode active material layer and the thin film layer are alloyed in at least part of the interface between the two such that at least a portion of the thin film layer other than alloyed with the anode active material layer has its original composition, and
the super-elastic or shape-memory effect material does not form an intermetallic compound with lithium.

2. An anode comprising:
an anode current collector;
an anode active material layer on one side of said anode current collector; and
a thin film layer containing nickel (Ni) and titanium (Ti) one side of said anode current collector,
wherein,
the anode active material forms an alloy with lithium,
the anode active material layer and the thin film layer are alloyed in at least part of the interface between the two such that at least a portion of the thin film layer other than alloyed with the anode active material layer has its original composition,
the thin film layer contains a super-elastic or shape-memory effect material, and
the super-elastic or shape-memory effect material does not form an intermetallic compound with lithium and is on a side of the anode current collector opposite that with the anode active material layer and is in contact with said anode active material.

3. An anode according to claim 2, wherein a composition ratio between nickel and titanium in the thin film layer is nickel:titanium=49 to 52:51 to 48, or nickel:titanium=35 to 45:45 to 55 at an atomic ratio.

4. An anode according to claim 1, wherein the anode active material layer contains at least one from the group consisting of simple substances, alloys, and compounds of silicon (Si) or germanium (Ge).

5. A battery comprising:
a cathode;
an anode; and
an electrolyte,
wherein,
the anode comprises
(a) an anode current collector,
(b) an anode active material layer one side of said anode current collector, and
(c) a thin film layer containing a super-elastic or shape-memory effect material on a side of said anode current collector opposite that with the anode active material layer and the super-elastic or shape-memory effect material is in contact with said anode active material,
wherein,
the anode active material forms an alloy with lithium,
the anode active material layer and the thin film layer are partially alloyed in at least part of the interface between the two such that at least a portion of the thin film layer other than that alloyed with the anode active material layer has its original composition, and
the super-elastic or shape-memory effect material does not form an intermetallic compound with lithium.

6. A battery comprising:
a cathode;
an anode; and
an electrolyte,
wherein,
the anode comprises
(a) an anode current collector,
(b) an anode active material on one side of said anode current collector, and
(c) a thin film layer containing nickel (Ni) and titanium (Ti) on a side of said anode current collector opposite that with the anode active material layer,
wherein,
the anode active material forms an alloy with lithium,
the anode active material layer and the thin film layer are partially alloyed in at least part of the interface between the two such that at least a portion of the thin film layer other than that alloyed with the anode active material layer has its original composition,
the thin film layer contains a super-elastic or shape-memory effect material, and the super-elastic or shape-memory effect material does not form an intermetallic compound with lithium and is in contact with said anode active material.

7. A battery according to claim 6, wherein a composition ratio between nickel and titanium in the thin film layer is nickel:titanium is (49 to 52):(51 to 48).

8. A battery according to claim 6, wherein an atomic ratio between nickel and titanium in the thin film layer is nickel:titanium (35 to 45):(45 to 55).

9. A battery according to claim 5, wherein the anode active material layer contains at least one from the group consisting of simple substances, alloys, and compounds of silicon (Si) or germanium (Ge).

* * * * *